(12) United States Patent
Yamazaki

(10) Patent No.: US 7,733,967 B2
(45) Date of Patent: Jun. 8, 2010

(54) DEVICE HAVING COMMUNICATION FUNCTION, METHOD FOR AUTOMATICALLY ADJUSTING TRANSMITTER, SYSTEM AND PROGRAM

(75) Inventor: Manabu Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1136 days.

(21) Appl. No.: 11/289,423

(22) Filed: Nov. 30, 2005

(65) Prior Publication Data

US 2007/0041454 A1   Feb. 22, 2007

(30) Foreign Application Priority Data

Aug. 19, 2005   (JP) .............................. 2005-238343

(51) Int. Cl.
*H04K 1/10*   (2006.01)
*H04L 27/28*   (2006.01)

(52) U.S. Cl. ........................ 375/260; 375/220; 375/285; 375/317

(58) Field of Classification Search .................. 375/257, 375/259, 222, 295, 316, 148, 219, 220; 370/221, 370/217, 220; 455/134
See application file for complete search history.

(56) References Cited

U.S. PATENT DOCUMENTS 6,128,512 A * 10/2000 Trompower et al. ......... 455/561
7,020,110 B2 * 3/2006 Walton et al. ................ 370/334
7,168,027 B2 * 1/2007 Lee et al. ..................... 714/775
7,345,992 B2 * 3/2008 Gorecki et al. .............. 370/221
2004/0141563 A1 * 7/2004 Gersemsky et al. ......... 375/259
2005/0147194 A1 * 7/2005 Koenenkamp ............... 375/348

FOREIGN PATENT DOCUMENTS

JP   2003-188863   7/2003

* cited by examiner

*Primary Examiner*—Chieh M Fan
*Assistant Examiner*—Qutbuddin Ghulamali
(74) *Attorney, Agent, or Firm*—Staas & Halsey LLP

(57) ABSTRACT

The transmission control unit of the device transmits sample data while changing the setting of output amplitude and emphasis of the transmitter within a prescribed range. The transmission processing unit of the device generates an eye diagram from the sample data received by the receiver, detects receivable phase-range data from the eye diagram, and transmits the same. The optimization processing unit of the device writes the phase-range data transmitted from the device into the table in correspondence to the output amplitude and emphasis of which the setting has been changed, determines optimum values of output amplitude and emphasis from the table obtained upon the completion of setting change within the prescribed range, and sets the same in the transmitter of the device. Then, the device, serving as the transmitting side, determines optimum values of output amplitude and emphasis of the transmitter and sets the same.

17 Claims, 16 Drawing Sheets

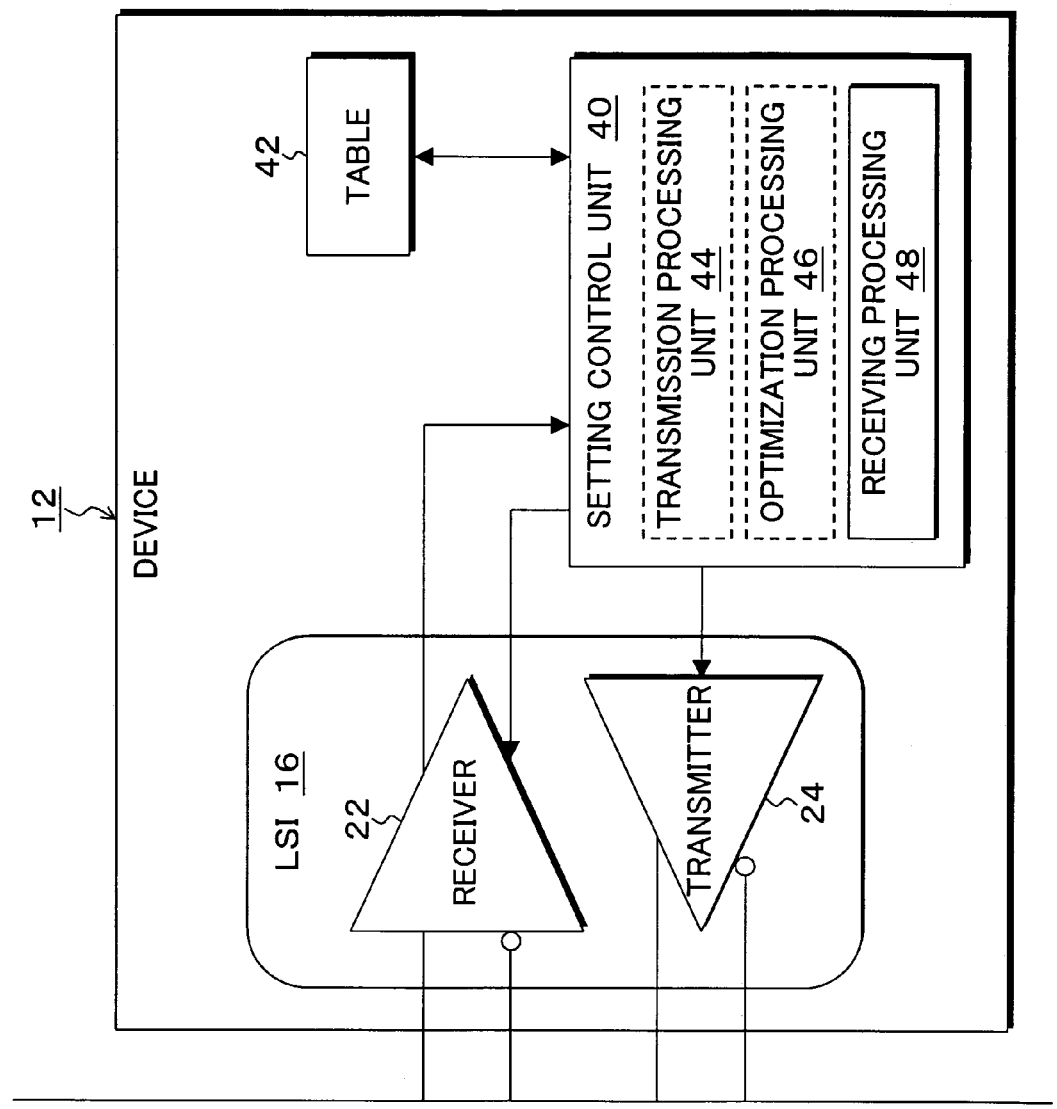

FIG. 5

| PHASE | $C_k$ k= 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| AMPLITUDE $A_i$ i=1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 1 | 1 | 1 | 1 | 1 | 1 | 1 | 0 | 0 | 0 | 0 |
| 6 | 0 | 0 | 0 | 0 | 1 | 1 | 1 | 1 | 1 | 1 | 1 | 1 | 0 | 0 | 0 | 0 |
| 7 | 0 | 0 | 0 | 0 | 0 | 1 | 1 | 1 | 1 | 1 | 1 | 1 | 0 | 0 | 0 | 0 |
| 8 | 0 | 0 | 0 | 0 | 0 | 0 | 0 | 1 | 1 | 1 | 1 | 0 | 0 | 0 | 0 | 0 |
| 9 | 0 | 0 | 0 | 0 | 0 | 0 | 0 | 0 | 1 | 1 | 0 | 0 | 0 | 0 | 0 | 0 |
| 10 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 | 0 | 0 | 0 |

FIG. 6

| PHASE EMPHASIS | k=1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| j=1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 1 | 0 | 0 | 0 | 0 | 0 |
| 3 | 0 | 0 | 0 | 0 | 0 | 0 | 0 | 0 | 0 | 1 | 1 | 1 | 0 | 0 | 0 | 0 |
| 4 | 0 | 0 | 0 | 0 | 0 | 0 | 0 | 1 | 1 | 1 | 1 | 1 | 0 | 0 | 0 | 0 |
| 5 | 0 | 0 | 0 | 0 | 0 | 0 | 1 | 1 | 1 | 1 | 1 | 1 | 1 | 0 | 0 | 0 |
| 6 | 0 | 0 | 0 | 0 | 0 | 1 | 1 | 1 | 1 | 1 | 1 | 1 | 1 | 0 | 0 | 0 |
| 7 | 0 | 0 | 0 | 0 | 1 | 1 | 1 | 1 | 1 | 1 | 1 | 1 | 1 | 0 | 0 | 0 |
| 8 | 0 | 0 | 0 | 0 | 0 | 1 | 1 | 1 | 1 | 1 | 1 | 1 | 1 | 0 | 0 | 0 |
| 9 | 0 | 0 | 0 | 0 | 0 | 0 | 1 | 1 | 1 | 1 | 1 | 0 | 0 | 0 | 0 | 0 |
| 10 | 0 | 0 | 0 | 0 | 0 | 0 | 0 | 1 | 1 | 1 | 1 | 0 | 0 | 0 | 0 | 0 |
| 11 | 0 | 0 | 0 | 0 | 0 | 0 | 0 | 0 | 1 | 1 | 1 | 0 | 0 | 0 | 0 | 0 |
| 12 | 0 | 0 | 0 | 0 | 0 | 0 | 0 | 0 | 0 | 1 | 1 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 | 0 | 0 | 0 |

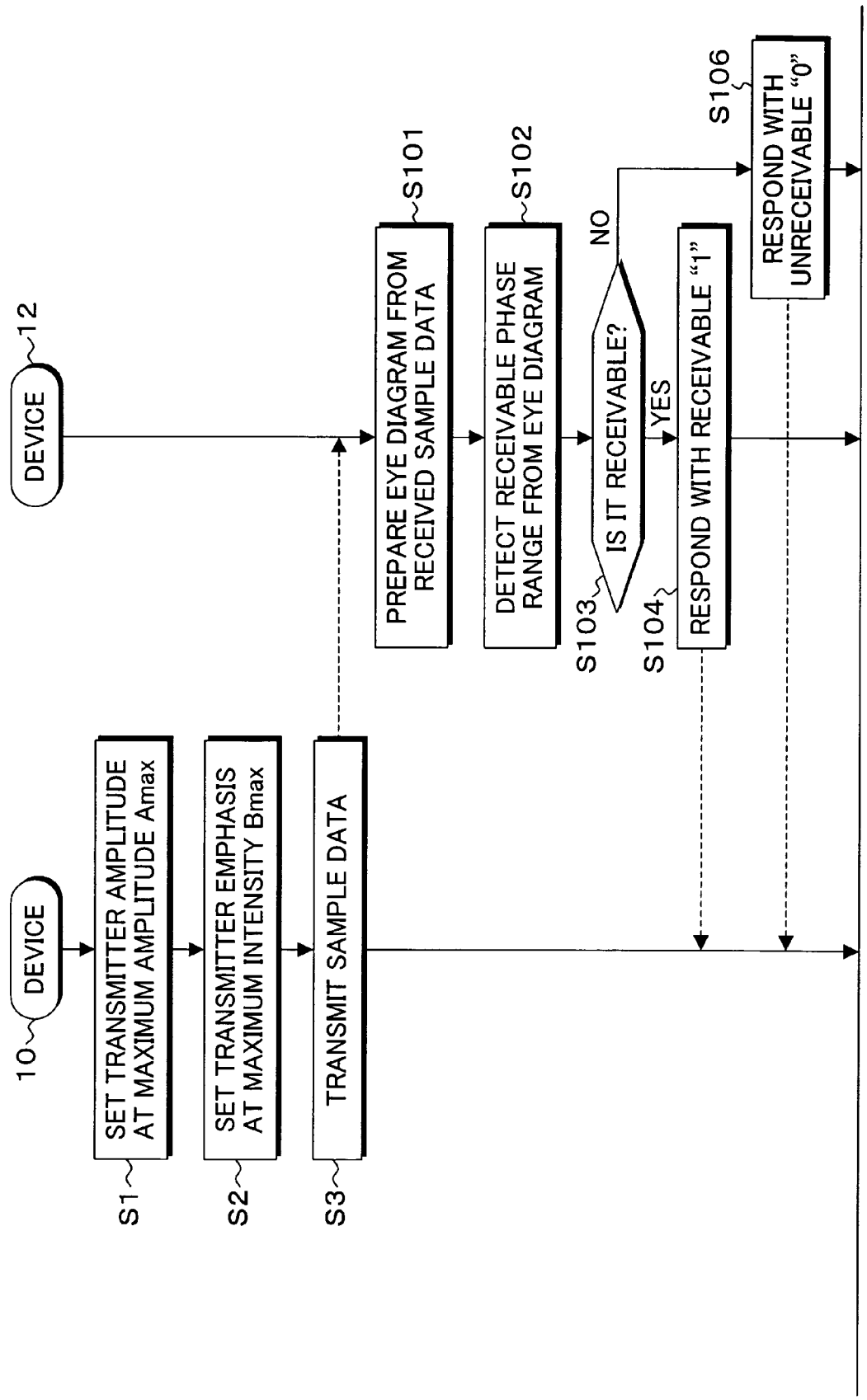

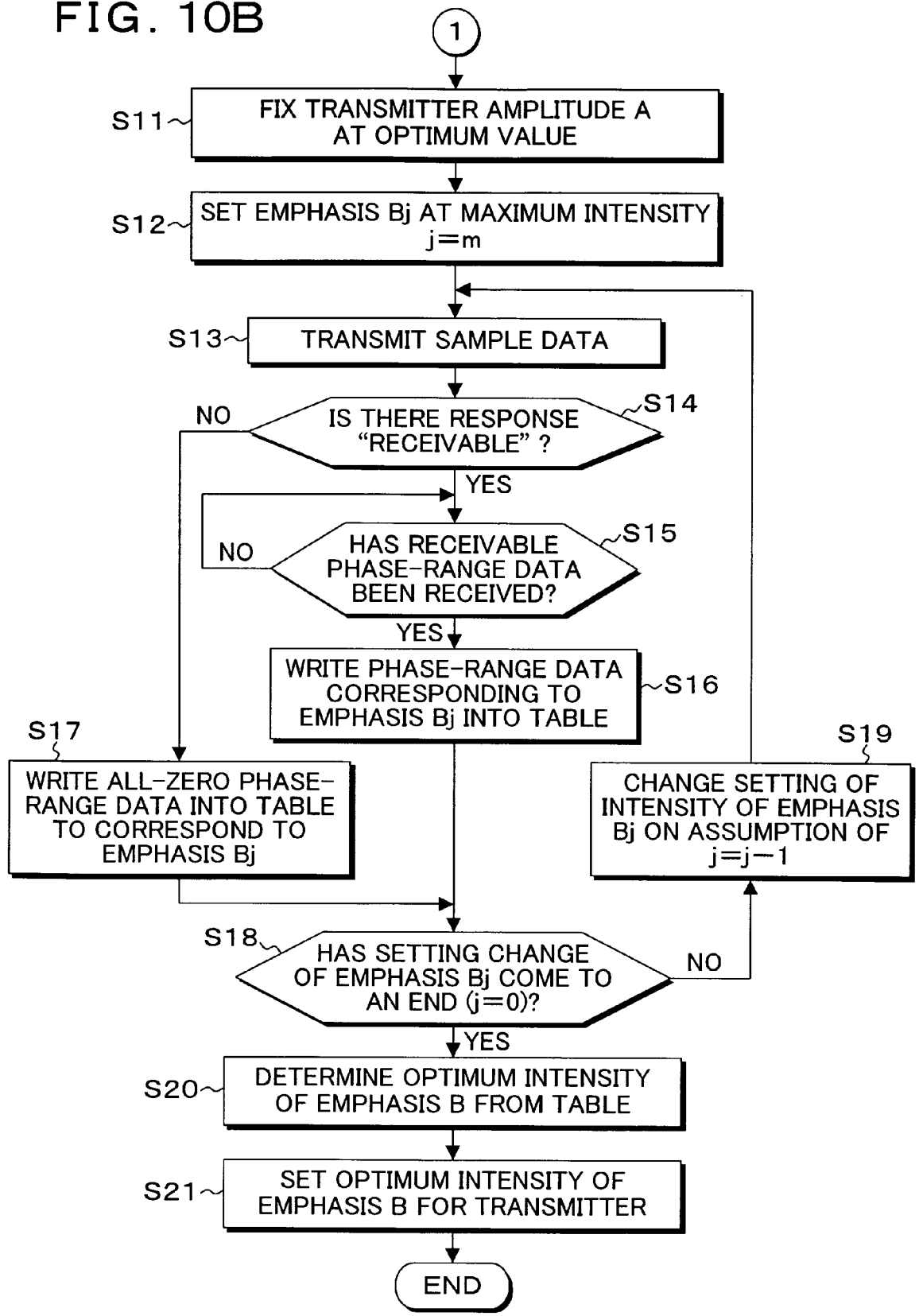

DEVICE HAVING COMMUNICATION FUNCTION, METHOD FOR AUTOMATICALLY ADJUSTING TRANSMITTER, SYSTEM AND PROGRAM

This application is a priority based on prior application No. JP2005-238343, filed Aug. 19, 2005, in Japan.

BACKGROUND OF THE INVENTION

1. Field of the Invention

The present invention relates to a device having a communication function, an automatic transmitter adjusting method, a system and a program applicable to a high-speed serial transmission interface or the like performing two-way data transmission of the order of giga-bit per second. More particularly, the invention relates to a device having a communication function, an automatic transmitter adjusting method, a system and a program capable of adjusting properties of a transmitter such as output amplitude and emphasis to optimum values on the basis of transmission of sample data.

2. Description of the Related Art

As input/output interfaces of personal computers or embedded devices, for example, PCI buses had conventionally been used. More recently, however, along with the tendency toward a higher processor operating frequency, high-speed serial interfaces of giga bit/second (Gbps) have been industrialized, and are becoming more and more popular.

Such a high-speed serial interface uses a differential transmission line comprising two signal lines having opposite polarities for transmission of bits. More specifically, the differential output of a transmitter (driver) of a device is connected to two signal lines, and the two signal lines are connected to the differential input of the receiver of the destination device. Since the characteristic impedance of the transmission line is regulated, for example, to 50Ω, the two signal lines terminates with a resistance of, for example, 50Ω at each device.

The adoption of such a differential transmission line improves the resistance to so-called common mode noise which acts simultaneously on two signal lines, facilitates high-speed operation by reducing the signal amplitude on the receiving side, and inhibits power loss caused by terminal resistance.

As a differential transmission line operates in a single direction, two-way transmission is ensured by using four signal lines. These four signal lines for carrying out two-way transmission are referred to as a lane. For example, in PCI Express known as a high-speed serial interface, the maximum data transfer rate per direction is 2.5 G bits/second (2.5 Gps). The actual maximum data transfer rate is however 2.0 G bits/second corresponding to 80% thereof, and for a lane, it becomes 4.0 G bits/second.

However, in such a conventional high-speed serial interface, permitting high-speed transmission of the giga-bit order per second, it is necessary to evaluate and determine optimum set values of output amplitude and emphasis of the transmitter for each device through a real-machine test, and determination of optimum values requires much time and labor.

That is, a real-machine evaluation is based on an operation comprising the steps of high-speed-serial-transmitting sample data from a transmitter by use of a signal generator, displaying an eye diagram by entering the sample data into a measuring instrument, and finding optimum values by changing the output amplitude and emphasis of the transmitter so that the amplitude is appropriate and the jitter becomes minimum from the eye diagram. For example, display of an eye diagram of a run of measurement requires transmission of sample data for 20 to 30 seconds, and this should be done for all the states of which the setting can be changed of the output amplitude and emphasis. Finding optimum values of output amplitude and emphasis thus becomes a very troublesome operation requiring much time and labor.

In the case of multiple lanes, furthermore, determining an optimum value for each lane is difficult since it takes too much time and labor. It is therefore inevitable to use a method of making a confirmation for a typical lane and adopting similar transmitting conditions for the other lanes. This causes a problem in that adjustment of high-speed serial interfaces is not always necessary and sufficient.

It is an object of the present invention to provide a device having a communication function, an automatic transmitter adjusting method, a system and a program in which optimum values of output amplitude and emphasis of the transmitter through automatic adjustment without requiring an artificial real-machine evaluation.

SUMMARY OF THE INVENTION

Device

The present invention provides a device (transmitting-side device) connected to other device via a transmission line, having a communication function for performing communication with the other device, comprising a transmission processing unit for transmitting data to the other device by changing the setting of properties of the transmitted data within a prescribed range; and an optimization processing unit for setting properties of the transmitted data on the basis of the received result information of the transmitted data received from the other device in correspondence to the transmitted data.

The properties of which the setting is changed is at least one of the output amplitude and the emphasis, The device having the communication function has a table for recording the received result information received from the other device, and the optimization processing unit sets properties of the transmitted data on the basis of the received result information recorded in the table.

According to the present invention, there is provided a device connected to other device via a transmission line, having a communication function for performing communication with the other device (receiving-side device), comprising a receiving processing unit for determining whether receivable or not of the data received from the other device, and for transmitting information showing whether receivable or not of the data to the other device.

In this aspect of the invention, the receiving processing unit generates an eye diagram from the received data, determines receivability of the data by sequentially shifting the phase within a prescribed range of the generated eye diagram, and transmits receivable phase-range data representing the receivability for each phase to the other device.

(Method)

According to the present invention, there is provided an automatic adjusting method of a device connected to other device via a transmission line and having a communication function for carrying out communication with the other device, comprising:

a transmission processing step transmitting data by changing the setting of properties of the transmitted data within a prescribed range to the other device; and an optimization processing step setting properties of the transmitted data on the basis of received result information of the transmitted data received from the other device in correspondence to the transmitted data.

In this aspect of the invention, properties of which the setting is changed include at least any one of the output amplitude and the emphasis. There is provided a table for recording received result information received from the other device; and the optimization processing step sets properties of the transmitted data on the basis of the received result information recorded in the table.

According to the present invention, there is provided an automatic adjusting method of a device connected with other device via a transmission line and having a communication function carrying out data communication with the other device, comprising a receiving processing step determining receivability of data received from the other device, and transmitting information representing data receivability to the other device.

In this aspect of the invention, the receiving processing step generates an eye diagram from the received data, determines receivability of the data by sequentially shifting the phase within a prescribed range of the generated eye diagram, and transmits receivable phase-range data representing receivability for each phase to the other device.

(Method 2)

According to the present invention, there is provided an automatic transmitter adjusting method for a transmitting device which has a pair of devices each having a transmitter and a receiver, in which the transmitter of one of the pair of devices is connected to the receiver of the other device, and the transmitter of the other device is connected to the receiver of the first device via another transmission line for two-way transmission (giga-bit/second order).

The automatic transmitter adjusting method of the present invention comprises:

a transmission processing step of transmitting sample data while changing the setting of the output amplitude and emphasis of the transmitter of the first device within a prescribed range;

a receiving processing step of generating an eye diagram from the sample data received by the receiver of the other device, and detecting and transmitting phase-range data receivable from the eye diagram; and an optimization processing step of writing the phase-range data transmitted from the other device into the table in correspondence to the output amplitude and emphasis of which the setting has been changed, and determining optimum values of output amplitude and emphasis from the table obtained at the end of setting change within the prescribed range for setting the same in the transmitter of the first device.

This is the adjustment of the go-system of the two devices.

For the adjustment of the return system of the two devices, the present invention further provides an automatic transmitter adjusting method comprising:

a transmission processing step of transmitting the sample data while changing the setting of the output amplitude and emphasis of the transmitter of the other device within a prescribed range;

a receiving processing step of generating an eye diagram from the sample data received by the receiver of the first device, and detecting and transmitting receivable phase-range data from the eye diagram; and an optimization processing step of writing the phase-range data transmitted from the first device into the table in correspondence to the output amplitude and emphasis of which the setting has been changed, and determining optimum values of the output amplitude and emphasis from the table obtained at the end of setting change within the prescribed range for setting the same in the transmitter of the other device.

In an embodiment of the automatic transmitter adjusting method:

the transmission processing step initializes the maximum values of the output amplitude and emphasis, transmits sample data to the transmitter of the first device, and then, in a state in which the emphasis is fixed at the maximum value, transmits the sample data while changing the setting of the output amplitude within a prescribed range;

the receiving processing step receives the sample data transmitted while changing the setting of the output amplitude within the prescribed range in a state in which the emphasis is fixed at the maximum value, generates an eye diagram, and detects and transmits receivable phase-range data from the eye diagram; and the optimization processing step writes the phase-range data transmitted from the other device into the table in correspondence to the output amplitude of which the setting has been changed and determines an optimum value of the output amplitude from the table obtained at the end of the setting change within the prescribed range.

In this embodiment, after determination of the optimum value of the output amplitude, the transmission processing step transmits the sample data while changing the setting of the emphasis within a prescribed range in a state in which the output amplitude is fixed at the optimum value for the transmitter of the first device;

The receiving processing step receives the sample data transmitted while changing the setting of the emphasis within a prescribed range in a state in which the output amplitude is fixed at an optimum value, generates an eye diagram, and detects and transmits receivable phase-range data from the eye diagram; and The optimization processing step writes the phase-range data transmitted from the other device into the table in correspondence to the emphasis of which the setting has been changed, determines an optimum value of the emphasis from the table obtained at the end of the setting change within the prescribed range, and sets the same for the transmitter of the first device.

The transmission processing step changes the setting of output amplitude and emphasis of the transmitter by the two-dividing method and transmits the sample data.

The receiving processing step extracts a clock from the received sample data, and detects a receivable phase range by displacing by one unit interval in the time axis direction starting from the clock starting phase for the eye diagram.

The receiving processing step transmits the phase-range data by the use of the transmitter before automatic adjustment at a low transmitting rate lower than a prescribed transmitting rate of the mega-bit order per second.

In the automatic transmitter adjusting method of the invention, at the end of automatic adjustment of the own transmitter, the first device transmits an adjustment end notice to the other device, and upon receipt of the adjustment end notice, the other device starts automatic adjustment of the own transmitter.

In the automatic transmitter adjusting method of the invention, automatic adjustment of the transmitter is started upon receipt of an adjustment start instruction from outside or upon detection of a change in the device environment.

(System)

According to the present invention, there is provided an automatic transmitter adjusting system which has a pair of devices each having a transmitter and a receiver, wherein two-way transmission of a giga bit/second order is accomplished by connecting the transmitter of a first device to the receiver of another device via a transmission line, and the transmitter of the other device to the receiver of the first device via another transmission line In the automatic transmitter adjusting system of the invention, each of the pair of devices comprises:

a transmission which transmits sample data while changing the setting of the output amplitude and emphasis of the own transmitter within a prescribed range;

an optimization processing unit which writes the phase-range data transmitted from the other device in correspondence to the output amplitude and emphasis of which the setting has been changed, determines an optimum values of the output amplitude and emphasis from the table obtained at the end of setting change within the prescribed range, and sets the same for the own transmitter; and a receiving processing unit which generates an eye diagram from the sample data received by the receiver of the other device, detects the receivable phase-range data from the eye diagram, and transmits the same.

In the optimization of the go-system of two devices:

the transmission processing unit of the first device transmits the sample data while changing the setting of the output amplitude and emphasis of the own transmitter within a prescribed range;

the receiving processing unit of the other device generates an eye diagram from the sample data received by The own receiver, detects receivable phase-range data from the eye diagram, and transmits the same; and the optimization processing unit of said first device writes the phase-range data transmitted from the other device into the table in correspondence to the output amplitude and emphasis of which the setting has been changed, determines optimum values of the output amplitude and emphasis from the table obtained at the end of setting change within the prescribed range, and sets the same for the own transmitter.

Then, in the optimization of the return system, after the end of automatic transmitter adjustment of the first device:

the transmission processing unit of the other device transmits the sample data while changing the setting of the output amplitude and emphasis of the own transmitter within a prescribed range;

the receiving processing unit of the first device generates an eye diagram from the sample data received by the own receiver, detects the receivable-range data from the eye diagram, and transmits the same; and the optimization processing unit of the other device writes the phase-range data transmitted from the other device transmitted from the other device into the table in correspondence to the output amplitude and emphasis of which the setting has been changed, determines optimum values of the output amplitude and emphasis from the table obtained at the end of setting change within the prescribed range, and sets the same for the own transmitter.

(Program)

According to the present invention, there is provided an automatic transmitter adjusting program which causes a computer of each of a pair of devices each having a transmitter and a receiver, wherein two-way transmission of the giga-bit/second order is accomplished by connecting the transmitter of a first device to the receiver of the other device via a transmission line, and the transmitter of the other device to the receiver of the first device via another transmission line, to execute.

In the automatic transmitter adjusting program of the invention:

a transmission processing step of transmitting sample data while changing the setting of the output amplitude and emphasis of the own transmitter within a prescribed range;

a optimization processing step of writing the phase-range data transmitted from the other device in correspondence to the output amplitude and emphasis of which the setting has been changed, determining an optimum values of the output amplitude and emphasis from the table obtained at the end of setting change within the prescribed range, and setting the same for the own transmitter; and a receiving processing step of generating an eye diagram from the sample data received by the receiver of the other device, detecting the receivable phase-range data from the eye diagram, and transmitting the same.

The details of the automatic transmitter adjusting system and program of the present invention are basically the same as those of the automatic transmitter adjusting method of the invention.

According to the present invention, properties such as output amplitude and emphasis of the transmitter can be set at optimum values and it is possible to ensure adjustment to an optimum operating condition without needing additional labor such as real-machine evaluation.

Transmission by setting optimum values of properties including output amplitude and emphasis of a transmitter can be applied in any environment through optimization based on an automatic adjustment processing performed from time to time upon occurrence of changes in operating environments of the device including the ambient temperature and temperature in enclosure and temperature, source voltage and the like of the LSI mounting the transmitter.

Optimum transmission can be ensured by setting optimum properties such as output amplitude and emphasis of the transmitter in response to conditions of the transmission line such as the length and presence of connector or cables.

Multiple lances, furthermore, can be used by setting optimum output amplitude and emphasis of the transmitter meeting conditions of the individual transmission lines. This eliminates the necessity to adjust conditions of lines, thus permitting reduction of the number of design processes of printed boards.

The above and other objects, features, and advantages of the present invention will become more apparent from the following detailed description with reference to the drawings.

BRIEF DESCRIPTION OF THE DRAWINGS

FIGS. 1A and 1B are block diagrams of a two-way high speed interface to which the automatic transmitter adjustment of the present invention is applied;

FIG. 5 is a descriptive view of the amplitude-phase table written by the optimization processing unit of the transmitting-side device of FIGS. 1A and 1B;

FIG. 6 is a descriptive view of the emphasis-phase table written by the optimization processing unit of the transmitting-side device of FIGS. 1A and 1B;

FIGS. 9A and 9B are time charts of automatic adjustment processing which determines an optimum value of output amplitude of the present invention;

FIGS. 10A and 10B are time charts of transmission processing which determines an optimum value of the output amplitude;

DETAILED DESCRIPTION OF THE PREFERRED EMBODIMENTS

Figure 1A:
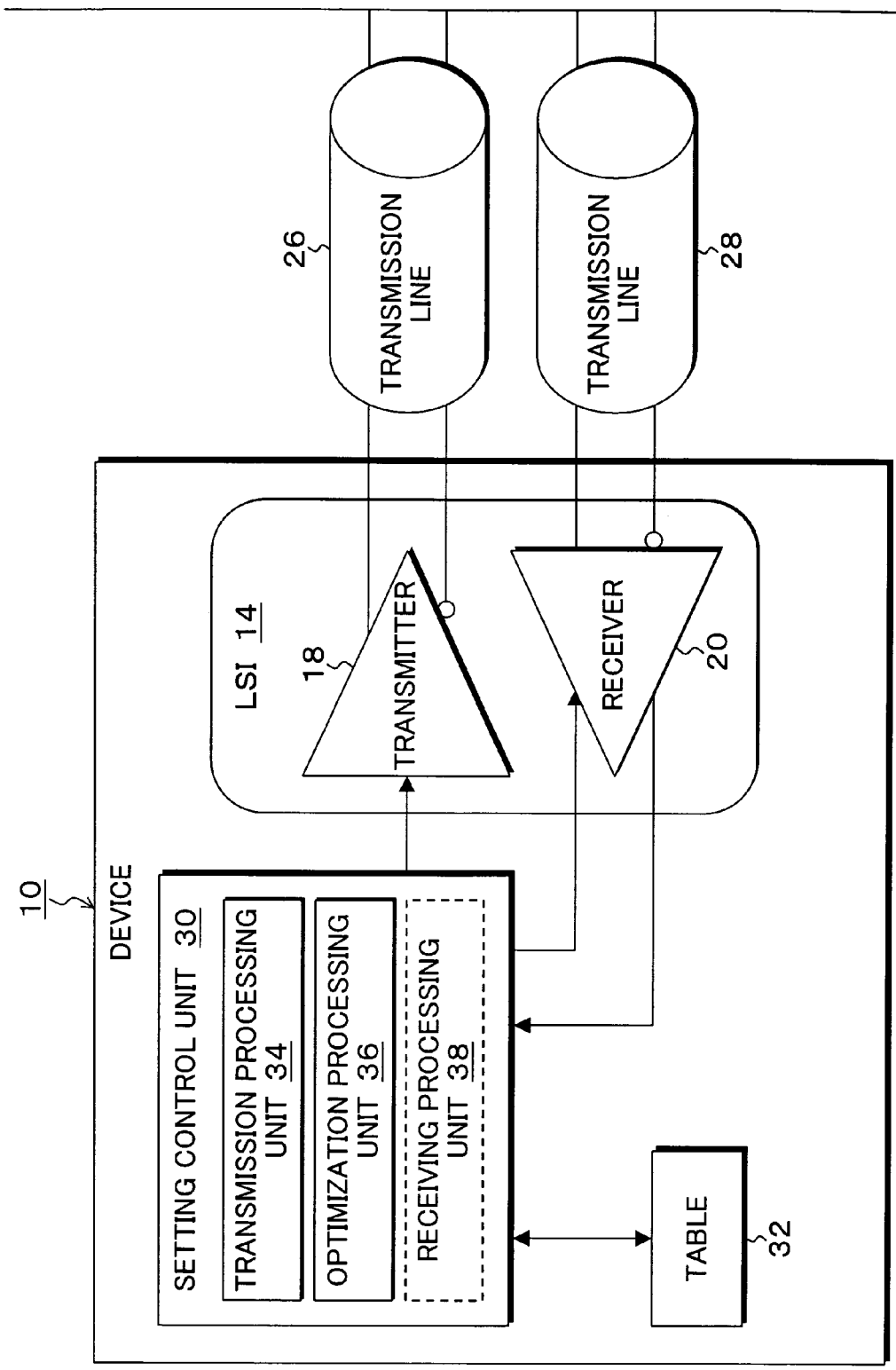

FIGS. 1A and 1B are blocks diagram of an interface between devices to which the automatic transmitter adjusting processing of the present invention is applied. In FIGS. 1A and 1B, the device 10 has an LSI 14, and the LSI 14 has a transmitter (driver) 18 and a receiver 20. The device 12 has an LSI 16, and the LSI 16 has a receiver 22 and a transmitter 24. The devices 10 and 12 are connected by transmission lines 26 and 28, and two-way transmission is carried out by high-speed serial transmission. More specifically, the transmitter 18 has a differential output terminal. Two signal lines composing the transmission line 26 are connected to the differential output terminal, and two signal lines of the transmission line 26 are connected to the differential input terminal of the receiver 22 of the device 12 serving as a destination. In the transmitter 24 of the device 12, the differential output terminal is connected to the two signal lines of the transmission line 28, and these two signal lines are connected to the differential input terminal of the receiver 20 of the destination device 10. In this embodiment, the transmitter 18 of the device 10, transmission line 26 and the transmission system of the receiver 22 form a go-system as viewed from the device 10. In contrast, the transmitter 24 of the device 12, transmission lie 28 and the receiver 20 of the device 10 form a return system. A single-lane transmission line serially transferring digital data at a rate of the giga-bit/second order through the four signal lines of the transmission lines 26 and 28 which connect these devices 10 and 12 is composed, and for example, PCI Express or the like is adopted. These devices 10 and 12 having a high-speed interface performing such a two-way signal transmission have setting control units 30 and 40 for optimizing transmission properties brought about by respective transmitters 18 and 22. Transmission processing units 34 and 44, optimization processing units 36 and 46, and receiving processing units 38 and 48 are respectively provided in the setting control units 30 and 40. In addition, tables 32 and 42 are provided for the setting control units 30 and 40, respectively. The setting control units 30 and 40 carry out automatic adjusting processing for optimizing the output amplitude A and emphasis B of the respective transmitters 18 and 24. Upon automatic adjustment processing of the go-system for optimizing the output amplitude A and emphasis B of the transmitter 18 by the setting control unit 30 of the device 10, the transmission processing unit 34 and the optimization processing unit 36 provided in the setting control unit 30 become active and function. For the setting control unit 40 of the device 12 serving as the destination, the receiving processing unit 48 becomes active and functions. After the completion of the optimization processing of the transmitter 18 in the go-system, as described above, automatic adjustment of transmission properties is conducted for the return-system composed of the transmitter 24 of the device 12, the transmission line 28 and then the receiver 20 of the device 10. This adjustment of transmission properties of the return-system, i.e., automatic adjustment for optimizing the output amplitude and emphasis of the transmitter 24 provided in the device 12 is accomplished by activating and causing functioning of the transmission processing unit 44 provided in the setting control unit 40, the optimization processing unit 46 and the receiving processing unit 38 provided in the setting control unit 30 of the device 10. The functions of the transmission processing unit 34 of the setting control unit 30 which executes automatic adjustment of transmission properties of the return-system composed of the transmitter 18, the transmission line 26 and the receiver 22, the optimization processing unit 36, and the receiving processing unit provided in the setting control unit 40 of the device 12 will now be described. The transmission processing unit 34 provided in the setting control unit 30 transmits sample data to the device 12 while changing the setting of output amplitude A and emphasis B of the transmitter 18 within a predetermined range. The change in setting of output amplitude A of the transmitter 18 is a change in setting of gain of the transmitter 18. The change in setting of emphasis B of the transmitter 8 is a change in setting which emphasizes high-frequency components in the output frequency characteristic of the transmitter 18. The term emphasis has the same meaning as preemphasis. The setting of emphasis can be changed by any of the following two methods. The first of these methods is based on the fact that the default characteristic is flat within a frequency band, and comprises relatively increasing the gain on the high-frequency side by reducing the gain on the low-frequency side for this flat characteristic. The second method is based on an observation that the default frequency characteristic presents a gain reduced on the low-frequency side and increased on the high-frequency side, and covers a setting change of increasing the gain on the low-frequency side closer to a flat characteristic. The setting change in output amplitude A and emphasis B by the transmission processing unit 34 covers transmission of sample data while changing the setting (n×m) times obtained by multiplying the numbers of setting change stages of output amplitude and emphasis through repetition of the transmission processing of sample data for 1 to m stages of output amplitude while changing the setting of emphasis within a range from 1 to n stages in a state in which, for example, the output amplitude is fixed at the initialized number of stages, on an assumption of a number of setting change stages of output amplitude A of n and a number of setting change stages of emphasis B of m. In an actual processing, since automatic adjustment processing including transmission of the sample data by setting change of (n×m) runs takes a very long period of time, transmission of sample data for determining optimum values is carried out through setting change using the two-dividing method as revealed later. For the purpose of accomplishing the processing for determining the optimum values in a short period of time, maximum values are set as initial values of output amplitude and emphasis. In this state, the sample data is sent while changing the setting of the output amplitude by, for example, the two-dividing method to determine an optimum value for the output amplitude. After thus determining an optimum value for the output amplitude, the setting of the emphasis by, for example, the two-dividing method in a state in which the optimum value is set in the transmitter 18 to perform a processing that determines an optimum value for the emphasis. It is needless to mention that, if there is a room in processing time, it is possible to carry out (n×m) runs of setting change over the entire range, and determine optimum values for output amplitude and emphasis. The sample data transmitted from the transmitter 18 via processing by the transmission processing unit 34 of the device 10 through a transmission line 26 by the setting of an output amplitude and an emphasis is received by the receiver 22 of the device 12 serving as the destination, and the receiving processing unit 48 provided in the setting control unit 40 conducts receiving processing necessary for determining optimum values for the received sample data. The receiving processing unit 48 generates an eye diagram from the received sample data, detects a receivable range from the thus generated eye diagram, and transmits the detected receivable range to the device 10 serving as the transmitting source. The optimization processing unit 36 of the setting control unit 30 writes the received phase-range data transmitted from the receiving processing unit 48 of the device 12 at the position of the table 32 corresponding to the output amplitude and emphasis of which the setting has been changed. Upon the completion of transmission of the sample data caused by the setting change of the prescribed range of output amplitude and emphasis and the writing processing by detection of the phase-range data based on the received sample data, the optimization processing unit 36 determines optimum values for the output amplitude and emphasis of the transmitted 18 from the contents of the table 32, and sets the determined values in the transmitter 18. At the end of the optimization processing for the transmitter 18 of the setting control unit 20, the completion of processing is notified to the device 12, and upon receipt of this notice, the setting control unit 40 of the device 12 is activated, and transmits the sample data while changing the setting of output amplitude and emphasis within a prescribed range by means of the transmission processing unit 44 for its own transmitter 24. The sample data is received by the receiver 20 of the device 10. The receiving processing unit 38 provided in the setting control unit 30 generates an eye diagram from the received sample data, detects a receivable phase range from the generated eye diagram, and sends back the receivable phase-range data via the transmitter 18, the transmission line 26 and the receiver 22. The optimization processing unit 46 of the setting control unit 40 writes this receivable phase-range data into the table 42. Upon the completion of all the setting change processing of output amplitude and emphasis of the transmitter 24 by the transmission processing unit 44, optimum values of output amplitude and emphasis of the transmitter 24 are determined for the transmitter 24 on the basis of the receivable phase-range data written in the table then. The automatic adjustment processing of setting optimum values of output amplitude and emphasis of the transmitters 18 and 24 composing a transmitting system for a single lane is thus completed.

Figure 2:
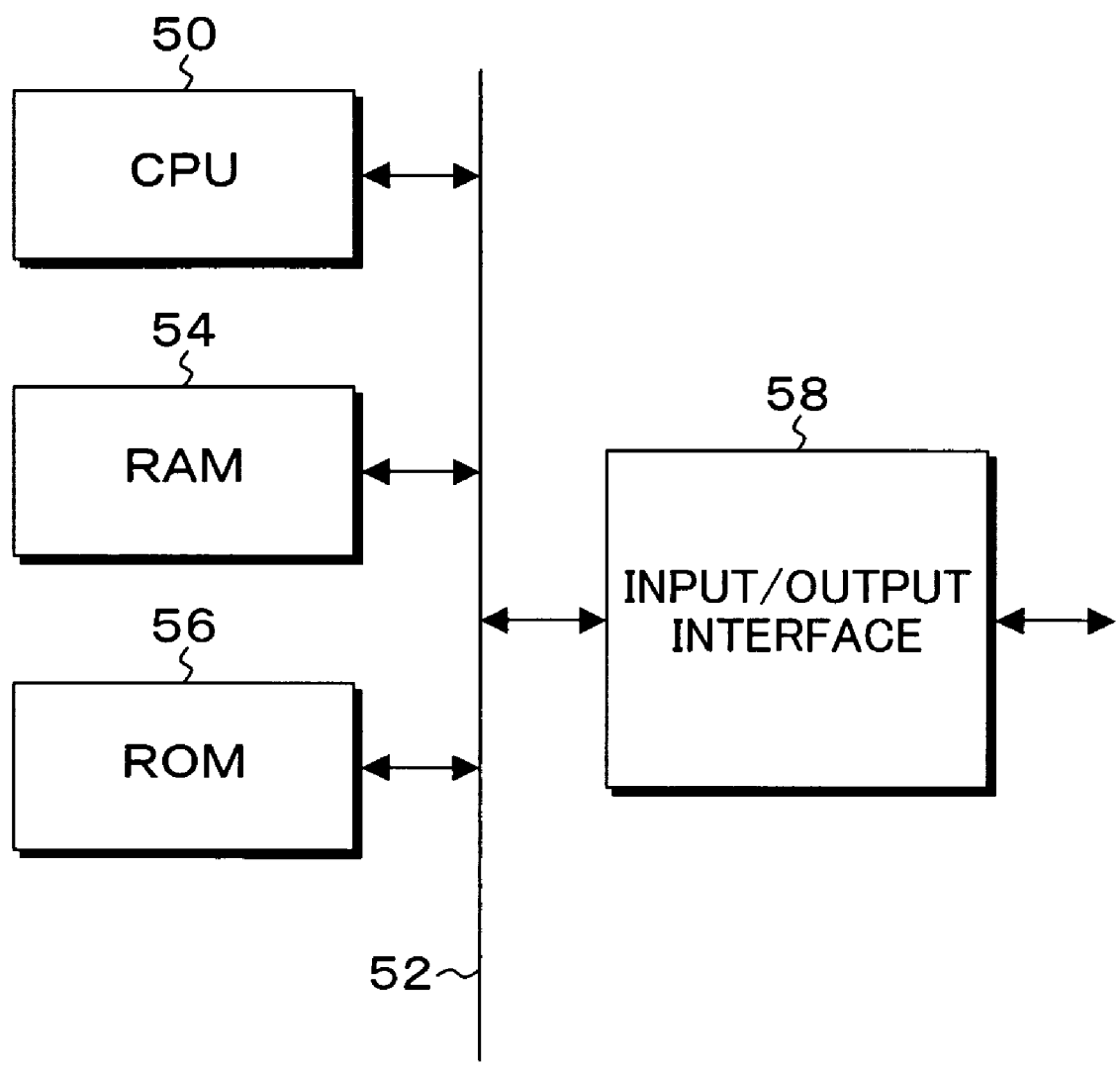
FIG. 2 is a block diagram of the computer hardware environment implementing the setting control unit shown in FIGS. 1A and 1B.
Figure 3:
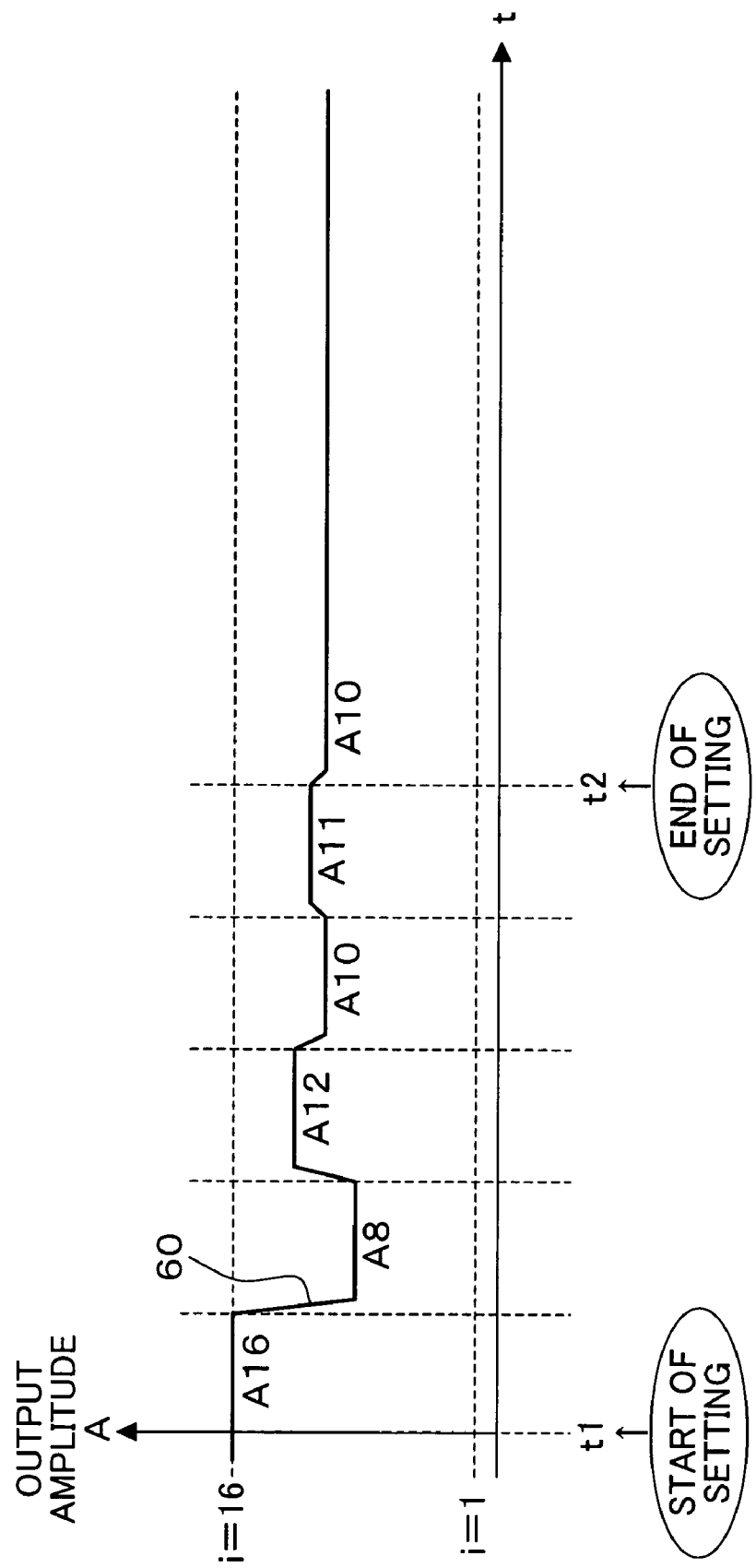
FIG. 3 is a descriptive view of the setting changing method of the output amplitude by the two-dividing method by the transmission processing unit of the transmitting-side device shown in FIGS. 1A and 1B.
Figure 4:
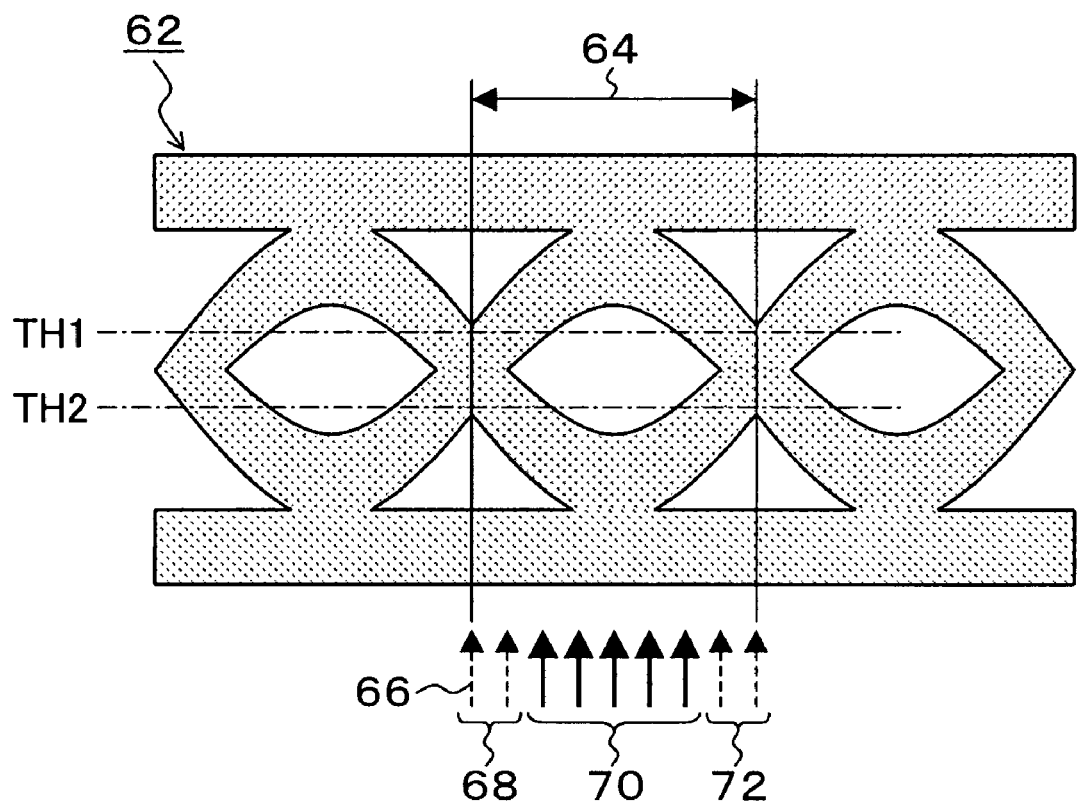
FIG. 4 is a descriptive view of the processing for generating an eye diagram and detecting receivable phase range by the receiving processing unit of the receiving-side device of FIGS. 1A and 1B.

The optimization processing of the transmitters 18 and 24 by the setting control units 30 and 40 provided in the devices 10 and 12 is accomplished by the execution of a program for implementing the respective functions of the transmission processing units 34 and 44, the optimization processing units 36 and 46, and the receiving processing units 38 and 48. For this purpose, a hardware environment of computer as shown in FIG. 2 would be provided as setting control units 30 and 40. In FIG. 2, the computer hardware environment has a CPU 50, and a RAM 54, a ROM 56 and an input/output interface 58 are connected to a bus 52 of the CPU 50. Programs for implementing the functions of the setting control units 30 and 40 of the present invention are stored in the ROM 56. An automatic adjustment processing for determining optimum values for the output amplitude and emphasis of the transmitters can be performed by deploying and executing the program of the ROM 56 in the RAM 54. The embodiment shown in FIGS. 1A and 1B covers a case where setting control units 30 and 40 are provided in the devices 10 and 12. When the devices 10 and 12 are small in scale, the program for the setting control units 30 and 40 for accomplishing the automatic transmitter adjustment of the present invention cannot in some cases built in. In such a case, an external apparatus having functions of the setting control units 30 and 40 may be connected to the devices 10 and 12. FIG. 3 is a descriptive view of a setting changing method of the output amplitude based on the two-dividing method by the transmission processing units 34 and 44 provided in the setting control units 30 and 40 shown in FIG. 1. In FIG. 3, the output amplitude A is shown in case, for example, where the setting of output amplitude can be changed in 16 stages (I=1 to 16). When it is possible to change the setting of output amplitude A in 16 stages, the number of stages of change in setting I is changed to I=16, 8, 12, 10, 11 and 10, and an optimum value of the output amplitude is determined from the receivable phase-range data in an eye diagram on the receiving side obtained in transmission of sample data with respective output amplitude A of 16, A8, A12, A10, A11 and A10. This setting change of the output amplitude by the two-dividing method known as binary search is similarly applicable as well when it is made possible to change the setting in 16 stages (j=1 to 16). The transmission time of sample data in a single run is determined from the time necessary for preparing an eye diagram on the receiving side. FIG. 4 is a descriptive view of the preparation of an eye diagram of an eye diagram by the receiving processing units 38 and 48 shown in FIG. 1 and a processing for detecting a data-receivable phase range from the opposite device. In FIG. 4, an eye diagram 62 is prepared, for example, in the case of automatic transmitter adjustment of the go-system for sending sample data from the driver 10 to the device 12, by transmitting the sample data by the transmitter 18 via the transmission line 26 in a state of setting of output amplitude and emphasis by the transmission processing unit 34, incorporating the sample data received by the receiver 22 into the receiving processing unit 48 of the setting control unit 40, and making an eye pattern from the received sample data. This preparation of the eye pattern requires a transmitting time of the sample data to some extent: for example, the eye pattern 62 is prepared from sample data received from transmission of the sample data for 20 seconds. Upon generation of the eye pattern 62, a range of one-unit interval (1 UI) 64 starting from a clock starting point 66 generated from the eye pattern 62. This range of one-unit interval 64 is divided into 16, and the clock phase is sequentially changed on the assumption of a phase range C (where k=1 to 16). From the eye width of this one-unit interval 64, the range of eye exceeding the ranges of threshold values TH1 and TH2 is determined as a receivable phase range. In the case shown in FIG. 4, since the eye is lower than the threshold values TH1 and TH2 at two arrow positions following the clock starting point 66, it is determined to be an unreceivable range 68. For the five thick-line arrows, the range of eye is over the threshold values TH1 and TH2. It is therefore determined to be a data receivable phase range 70. The range represented by two dotted lines following the data receivable phase range 70 is therefore determined to form an unreceivable phase range 72 like the unreceivable range 68. Following the eye diagram as described above, a receivable phase range is detected and sent to the transmitting side as receivable phase-range data. That is, the receivable phase data is transmitted to the receiver 20 of the device 10 serving as the transmitting source by means of the transmitter 24 of the device 12 via the transmission line 28. More specifically, as receivable phase-range data, information regarding the phase determined to be capable of receiving data and information regarding the phase determined not to be capable of receiving data are transmitted. At this moment, for the return-system composed of the transmitter 24, the transmission line 28 and the receiver 20, optimization of the transmitter 24 is not carried out. The receivable phase-range data is therefore transmitted at a low-speed transmission rate of, for example, the mega-bit/second order, which is sufficiently lower than the transmission rate of the giga-bit/second order of this high-speed interface. Consequently, it is possible to transmit the receivable phase-range data detected by the receiving processing unit 48 accurately to the device 10 side which is the transmitting source even by using a non-adjusted return-system. When a receivable phase can be detected from the eye diagram, the receiving processing unit 48 transmits a bit "1" representing a response "Receivable" from the transmitter 24 to the device 10 side, and thereafter transmits the receivable phase-range data. On the other hand, when a receivable phase cannot be detected for one-unit interval 64 from the eye diagram, the transmitter 24 is caused to output a bit "0" representing a response "unreceivable". When transmitting a bit "0" representing a response "unreceivable", it is not necessary to transmit the receivable phase-range data.

FIG. 5 is a descriptive view of an output amplitude-phase table written into the table 32 by the optimization processing unit 36 provided in the setting control unit 30 of the device 10 shown in FIGS. 1A and 1B. In FIG. 5, the amplitude-phase table 74 can change the setting of the output amplitude Ai of the transmitter 18 into 16 stages (I=1 to 16). For the phase Ck of the one-unit interval 64 in the eye diagram 62 shown in FIG. 4, on the other hand, a phase range divided into 16 (Ck=1 to 16) is set. The information showing receivability in each phase is recorded for each output amplitude Ai. The transmission processing unit 34 of the setting control unit 30 of the device 10 shown in FIGS. 1A and 1B sends sample data while sequentially changing the setting of the output amplitude Ai in the amplitude-phase table 74 into 16 stages including A1 to A16. Upon this transmission, the receivable phase-range data is received from the opposite device and written into the amplitude-phase table 74. In this table, "0" represents an unreceivable phase position, and "1" represents a receivable phase position. In the amplitude-phase table 74 upon completion of this write, as shown in FIG. 5, an area 76 indicated by a thick line represents an area of receivable phase-range data. An optimum output amplitude of the transmitter 18 is determined on the basis of the area 76 of the receivable phase-range data. An optimum output amplitude may be determined by adopting a value corresponding, for example, to the position of the center of gravity in the area 76 of the receivable phase-range data. In this case, there exists a receivable phase range in each of the I=6 to 14 stages, and the size of the receivable phase range in each of the amplitude stages I=6 to 14 is equal to a value obtained by adding the value representing the phase range in each of the stages of amplitude, i.e., (2, 4, 4, 6, 8, 8, 7, 5 or 3). The total of output amplitude Ai×receivable phase Ck is equal to 485, and the center of gravity of data is at 10.3. The optimum output amplitude value the closest to this value of center of gravity of data is I=10, i.e., A10. The optimum output amplitude (A10) thus determined is set in the transmitter 18.

FIG. 6 is a descriptive view of the emphasis-phase table 80 written in the table 32 by the optimization processing unit 36 provided in the device 10 shown in FIGS. 1A and 1B. In this emphasis-phase table 80, there are written, for 16 stages including k=1 to 16 of the phase Ck of the abscissa representing the receivable phase range detected on the basis of the eye diagram from the receiving side by transmitting the sample data while sequentially changing the emphasis into set values Bj=B1 to B16 for the 16 stages j=1 to 16 in a state in which the output amplitude is fixed at the optimum value, after determination of an optimum output amplitude 78(A10), for example, from the amplitude-phase table 74 shown in FIG. 6 and setting thereof in the transmitter 18. In this case also, "0" represents the unreceivable phase and "1" represents the receivable phase. In this case, furthermore, an area 82 filled with "1"s encircled by a thick line represents the receivable phase range obtained while changing the setting of emphasis. For this area 82 representing receivable phase-range data, the value B11 with a set number of stages of emphasis j=11 as an optimum emphasis is determined by determining the position of the center of gravity as in the case of the amplitude-phase table 74 shown in FIG. 5, and this value is set in the transmitter 18. In the present invention, as described above, since optimum values of the output amplitude and emphasis of the transmitter are determined on the basis of the receivable phase-range data in the eye diagram obtained on the receiving side by transmitting the sample data, an optimum value can be set in an area of positions having the widest margin within the receivable data range meeting the condition of actual transmission. In addition, as the optimum value is determined on the basis of the eye diagram, the optimum value can be determined appropriately coping with the effect of jitter caused in the transmission line.

Figure 7:
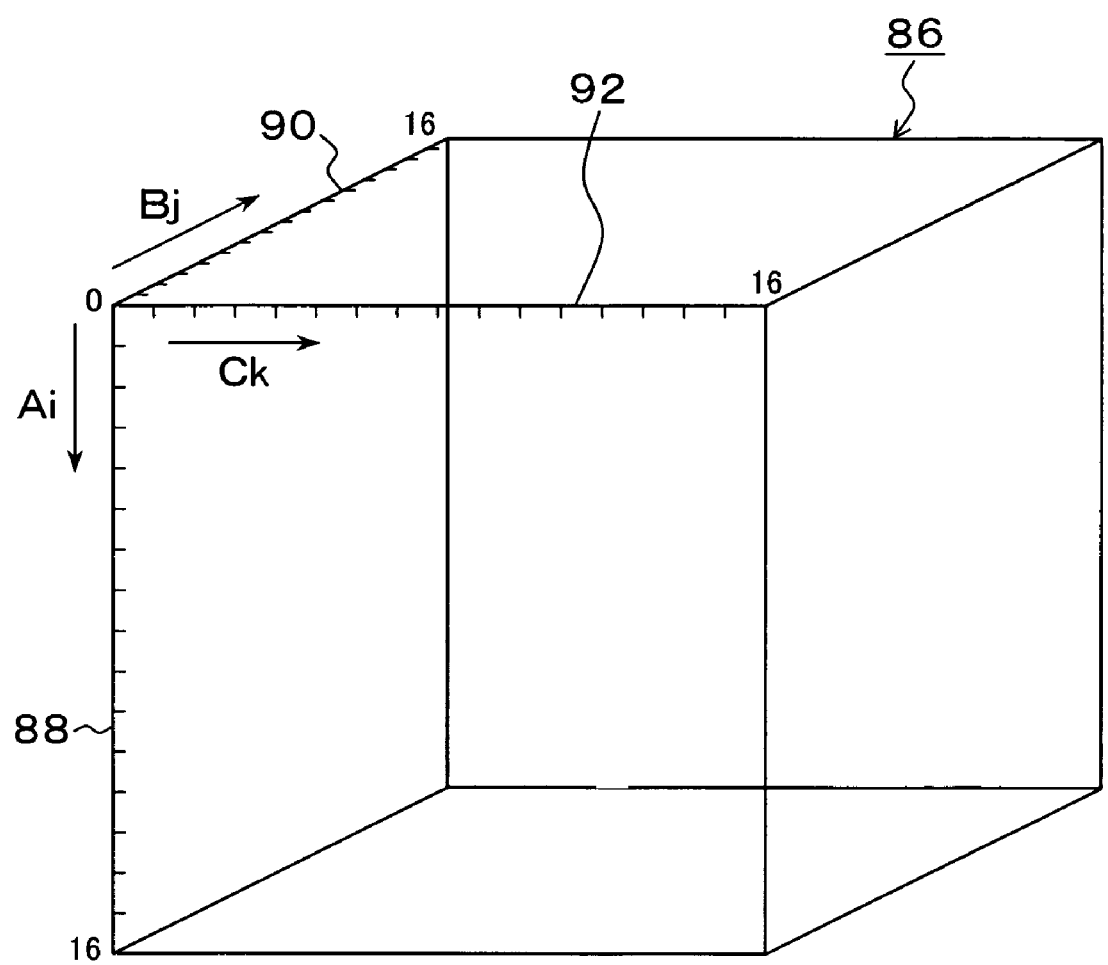
FIG. 7 is a descriptive view of the table space composing the table of FIGS. 1A and 1B.
Figure 8:
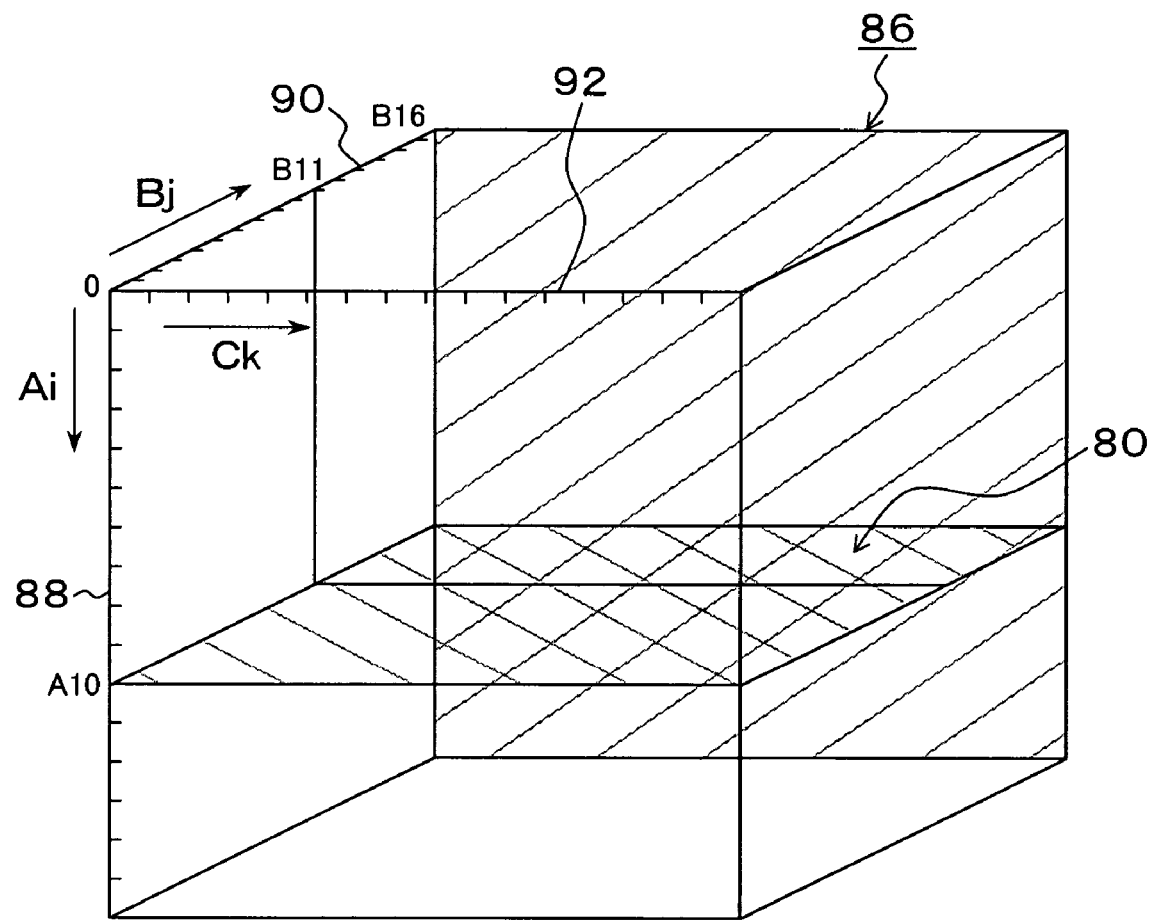
FIG. 8 is a descriptive view of the arrangement position of the table space of the amplitude-phase table shown in FIG. 5 and the emphasis-phase table shown in FIG. 6.

FIG. 7 is a descriptive view of a table space composing the tables 32 and 42 in FIGS. 1A and 1B. In FIG. 7, the table space 86 has an ordinate having an origin 0 as the starting point, representing the output amplitude Ai set at I=1 to 16, an abscissa representing the phase Ck with k=1 to 16, and a depth-direction axis representing the emphasis Bj with j=1 to 16. Regarding the table space 86 as described above, the amplitude-phase table 74 shown in FIG. 5 and the emphasis-phase table 80 shown in FIG. 6 are present as shown in FIG. 8. In the amplitude-phase table 74 shown in FIG. 5, the emphasis Bj is set at the maximum value B16. It therefore forms the deepest table surface. In the emphasis-phase table 80 shown in FIG. 6, the optimum output amplitude 78 is determined with a value A10 of I=10 from the amplitude-phase table 74 shown in FIG. 5, and in this fixed state, phase data is written by changing the setting of emphasis. It therefore serves as the horizontal table surface passing through the optimum value I=11.

The arrangement of the table surfaces in FIG. 8 is such that, in a state in which the output amplitude and emphasis are set at maximum values, the emphasis is fixed at the maximum value, and phase data within a phase-receivable range are detected while changing the setting of the output amplitude to 16 stages. The detected result us written. After determination of an optimum value of output amplitude, the setting of emphasis is changed into 16 stages of j=1 to 16 by fixing the output amplitude at the thus determined output amplitude, thus preparing the emphasis-phase table 80 formed by receivable phase-range data written into the table. Two tables suffice for table data in this case. When the setting of emphasis B is changed in i=1 to 16 stages while changing the setting of output amplitude Ai in I=1 to 16 stages, in contrast, (16×16) table surfaces would be arranged in the table space 86. In this case, receivable phase-range data would three-dimensionally be existent for the output amplitude and emphasis in the table space 86. It is thus possible to determine optimum output amplitude and emphasis by determining the position of the center of gravity of the solid body within the receivable phase range.

Figure 9B:
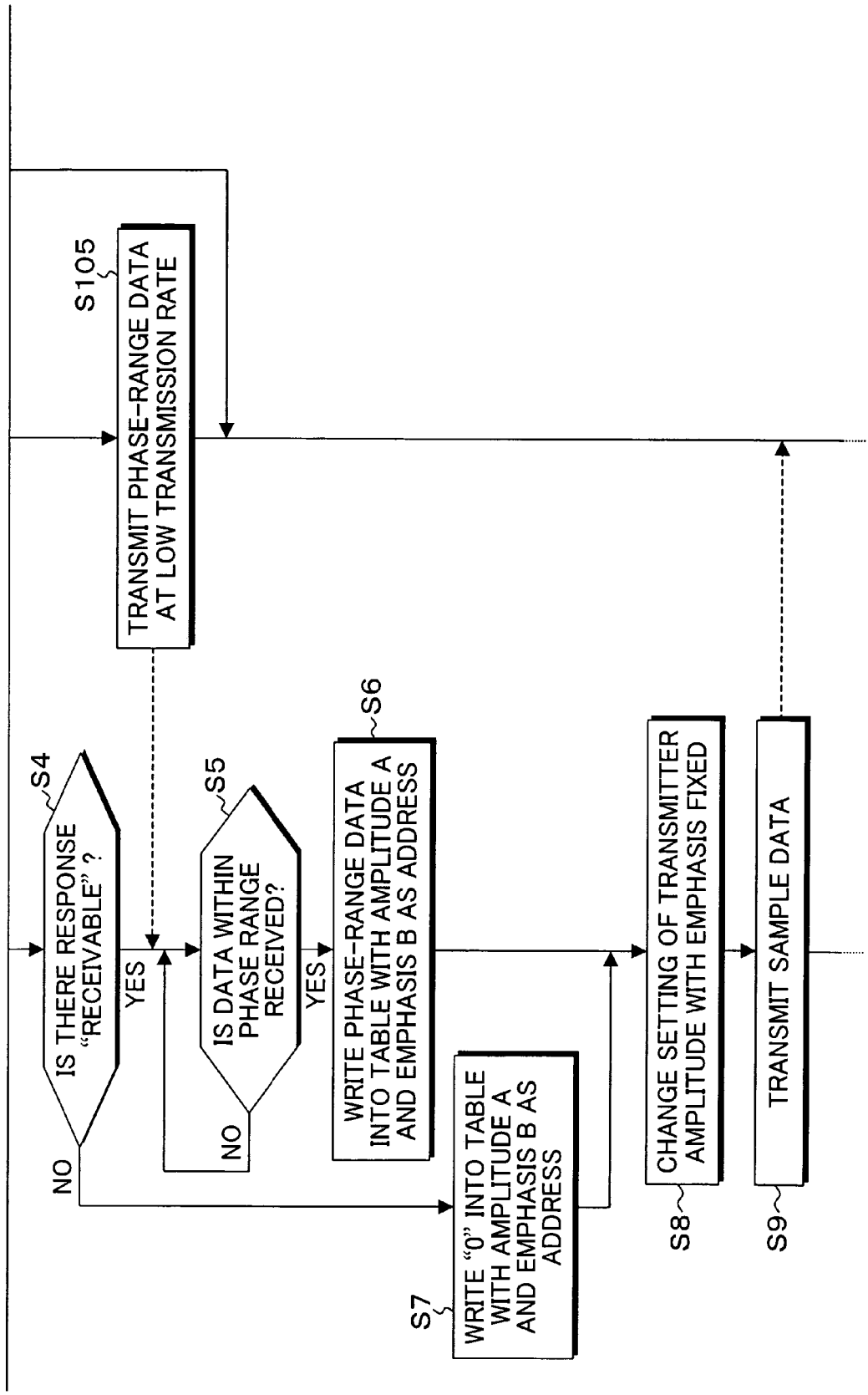

FIGS. 9A and 9B are time charts of automatic adjustment processing when performing optimization of the transmitter 18 by the setting control unit 30 of the device 10 shown in FIGS. 1A and 1B. In FIGS. 9A and 9B, the automatic adjustment processing by the device 10 is started with an instruction of the operator from outside, or a sudden change, for example, in service environment, such as temperature, of the device 10 as a trigger. In the device 10, the output amplitude A of the transmitter 18 is first set at a maximum amplitude Amax in step S1. Then in step S2, the emphasis B of the transmitter 18 is set at a maximum intensity Bmax, and in this state, the sample data is transmitted for a certain period of time sufficient to prepare an eye diagram in the device 12 on the receiving side in step S3. The device 12 on the receiving side receiving the transmission of the sample data from the device 10 prepares an eye diagram from the received sample data in step S101. Then in step S102, the receivable phase range is detected from the eye diagram through search on the time axis at one-unit interval 64 as shown in FIG. 5.

When a receivable phase is detected from this eye diagram, it is identified in step S103, and in step S104, a response is given showing "1" representing "receivable". When a receivable phase could not be detected from the eye diagram in step S103, a response "0" representing "unreceivable" is given in step S106. When a response "1" meaning "receivable" is given in step S104, the process advances to step S105, and the phase-range data detected at a low transmission rate are transmitted by the transmitter 24 to the device 10. In the device 10, presence of a response "receivable" is checked in step S4. Upon receipt of a response "1" meaning "receivable", the process goes to step S5, the device 10 receives the phase-range data received in succession. In step S6, the phase-range data are written at the address of the table 32 corresponding to the amplitude A. When a response "0" meaning "unreceivable" is identified in step S4, the process advances to step S7, and "0" is written for the active phase range at the address of the table 32 corresponding to the amplitude A. Then in step S8, the setting of the transmitter output amplitude is changed. At this point in time, the preemphasis B is always fixed at the maximum intensity Bmax, and in this state, the sample data are transmitted again in step S9. The same steps are subsequently repeated.

Figure 10A:
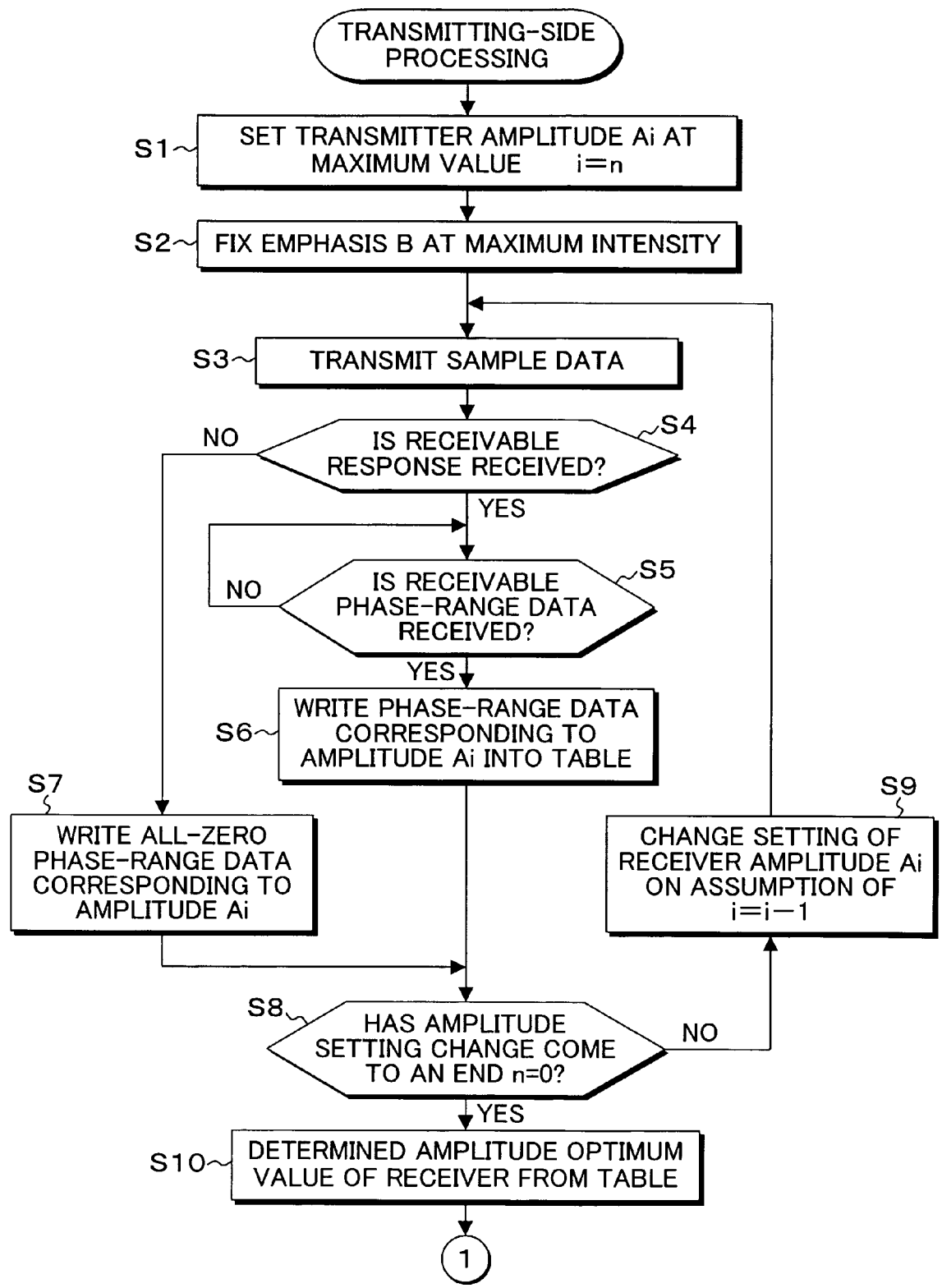

FIGS. 10A and 10B are flowcharts of the transmitting-side processing performed by the transmission processing units 34 and 44 provided in the setting control units 30 and 40 of the devices 10 and 12, and the optimization processing units 36 and 46. In FIG. 10A, the transmitting-side processing is started with a start instruction of automatic adjustment from outside or a change in environment temperature of the device as a trigger. The following description is based on a case where the transmitter 18 of the device 10 shown in FIGS. 1A and 1B is adjusted. The output amplitude Ai of the transmitter 18 is set at the maximum value in step S1. In this case, the setting of output amplitude is changeable in n stages with a maximum value i=n. Then in step S2, the emphasis B of the transmitter 18 is fixed at the maximum intensity. In this state, the sample data are transmitted from the transmitter 18 in step S3 for a prescribed period of time necessary for preparing an eye diagram by the receiving processing unit 48 of the device 12. Then in step S4, it is checked whether or not a response "receivable" has been received from the transmission destination. If the response is "receivable", a response "1" is received. In this case, the process goes to step S5, and it is checked whether or not subsequently sent receivable phase-range data are received. Upon receipt of such a response, phase-range data for the then output amplitude, i.e., the maximum output amplitude An are written in the table 32. When a response "0" meaning "unreceivable" is received in step S4, the process advances to step S7. In this case, all-zero phase-range data are written into the table for the then amplitude, i.e., the maximum amplitude An. Then in step S8, it is checked whether or not the setting change of output amplitude has been completed, i.e., n=0 or not. If not as yet completed, the process goes to step S9, and the setting of the output amplitude Ai of the receiver is changed to the next number of stages with i=i−1. Then, the process returns to step S3, and the sample data are transmitted again. Change of setting of output amplitude in step S9 is not carried out stage by stage with i=n as the maximum value, but, as shown in FIG. 3 for example, the setting may be changed by the two-dividing method known as binary search. Upon determination of the end of setting change of output amplitude in step S8, an optimum value of amplitude for the receiver is determined from the table 32 in step S10. The determination of this optimum value of output amplitude is accomplished by the same technique as that shown for the amplitude-phase table 74 shown in FIG. 5.

Then in step S11 shown in FIG. 10B, the output amplitude A of the transmitter 18 is fixed at the optimum value determined in step S10. Then in step S12, the emphasis Bj is set at the maximum value. If the setting of emphasis Bj can be changed in m stages, a maximum intensity j=m is given. Then in step S13, the sample data are transmitted for a certain period of time necessary for preparation of an eye diagram on the receiving side. Then in step S14, it is checked whether or not a response "1" meaning "receivable" is received. If received, receivable phase-range data sent thereafter are received in step S15, and in step S16, the phase-range data for emphasis Bj are written into the table 32. When a "0" meaning "unreceivable" is received in step S14, all-zero phase-range data for emphasis Bj at this moment are written into the table 32 in step s17. Then in step S18, it is checked whether or not changing of setting of emphasis Bj has been completed, i.e., j=0 or not. If not completed as yet, the process goes to step S19, and after changing the setting to the next-stage emphasis Bj, the process returns to step S13, and the sample data are transmitted again. Also for changing the setting of emphasis Bj in step S19, the setting may be changed, not stage by stage, but in accordance with the two-dividing method known as binary search as shown in FIG. 4. When the end of setting change of emphasis Bj is determined in step S9, the process advances to step S20. An optimum intensity of emphasis B is determined from the table 32, and in step S21, the optimum intensity of emphasis B is set in the transmitter 18, thus completing a series of adjustment processing operations. In the transmission processing shown in FIGS. 10 and 11, specifically in the processing on the transmitting side by the setting control unit 30 of the device 10 conducting the first adjustment, the end information "0" representing the end of automatic adjustment upon the end of transmission processing is transmitted to the device 12. Upon receipt of an end notice "0" from the receiver 22 of the device 12, the transmission processing unit 44 and the optimization processing unit 46 of the setting control unit 40 are started up. The receiving processing unit 48 stops starting. The automatic adjustment processing for determining optimum values of output amplitude and emphasis of the transmitter 24 of the device 12 is thus started.

Figure 11:
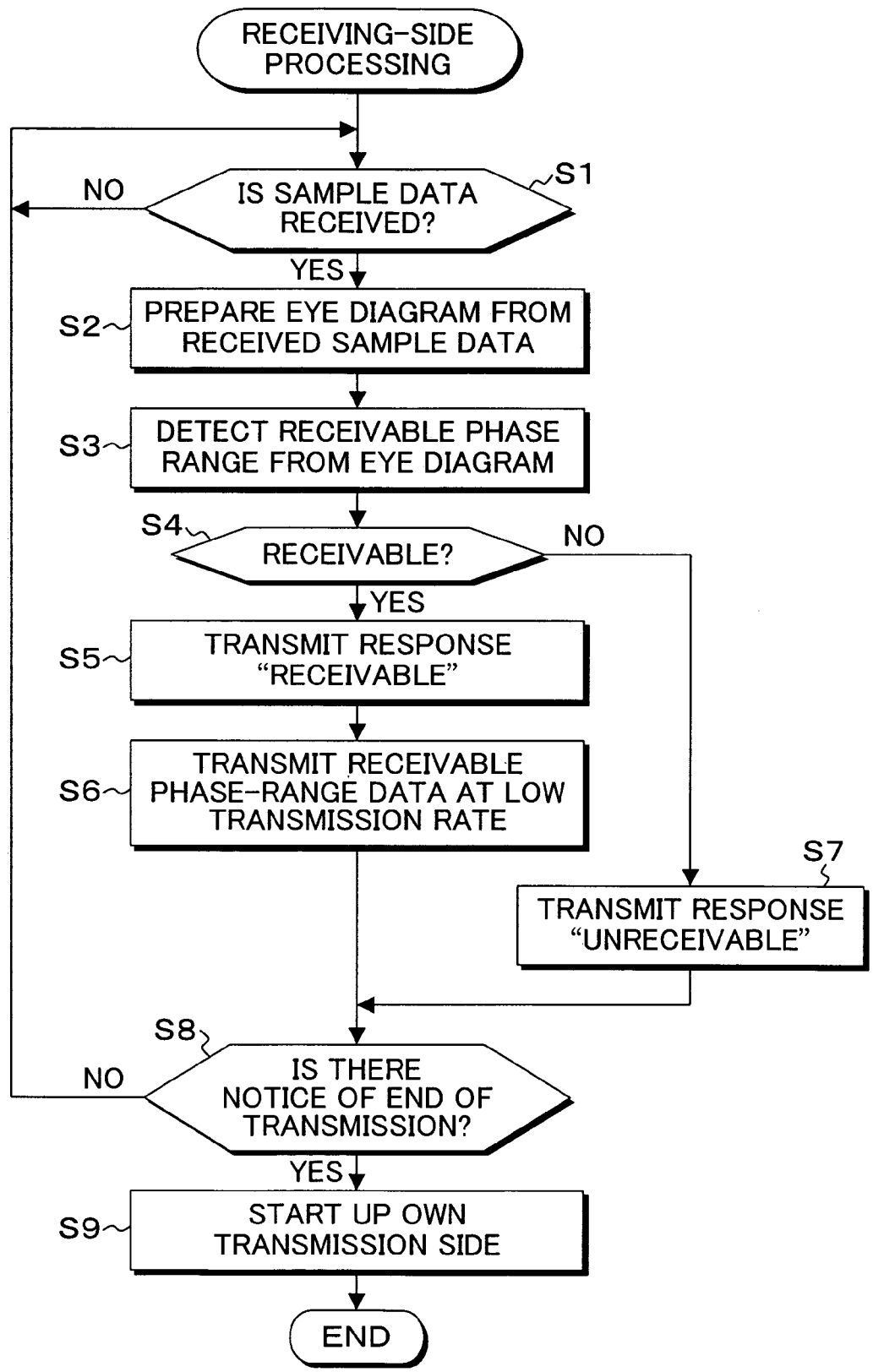
FIG. 11 flowchart of the receiving-side processing which detects a receivable phase range in the receiving-side device.

FIG. 11 is a flowchart of the receiving-side processing of the receiving processing units 38 and 48 provided in the setting control units 30 and 40 of the devices 10 and 12 shown in FIGS. 1A and 1B. In a case where output amplitude and emphasis of the transmitter 18 of the device 10 are to be optimized in this receiving-side processing, the processing of the receiving processing unit 48 provided in the setting control unit 40 of the device 12 is the receiving-side processing shown in FIG. 11. In this receiving-side processing, receipt of the sample data by the receiver 22 is checked in step S1. Upon receipt of the sample data, the process goes to step S2, and an eye diagram is prepared from the received sample data. Then in step S3, a receivable phase range is detected from the eye diagram as shown in FIG. 4. Then in step S4, if a receivable phase range can be detected, the process advances to step S5, and a response "0" meaning "receivable" is given to the transmitter 24. Upon receipt of this response, in step S6, receivable phase-range data are transmitted to the device 10 through a low-speed transmission route. If a receivable phase range cannot be detected from the eye diagram in step S4, unreceivability is determined in step S4, and a response "0" representing "unreceivable" is given via the transmitter 24 in step S7. Then in step S8, it is checked whether or not there is a transmission end notice "0" from the device 10, and the steps from step S1 are repeated until a transmission end notice is received. When the transmission end notice is determined in step S8, the process advances to step S9, and the processes on the own transmitting side, i.e., processing shown in the flowcharts of FIGS. 10 and 11 is started up. An automatic adjustment processing for determining optimum values of output amplitude and emphasis for the transmitter 24 is thus started. Upon the completion of the transmitting-side processing in the device 12, a transmission end notice is given to the device 10 serving as the destination. Since the optimization processing of the transmitter 18 has already been completed in the device 10, upon receipt thereof, the device 10 terminates the series of automatic adjustment processes.

Figure 12A:
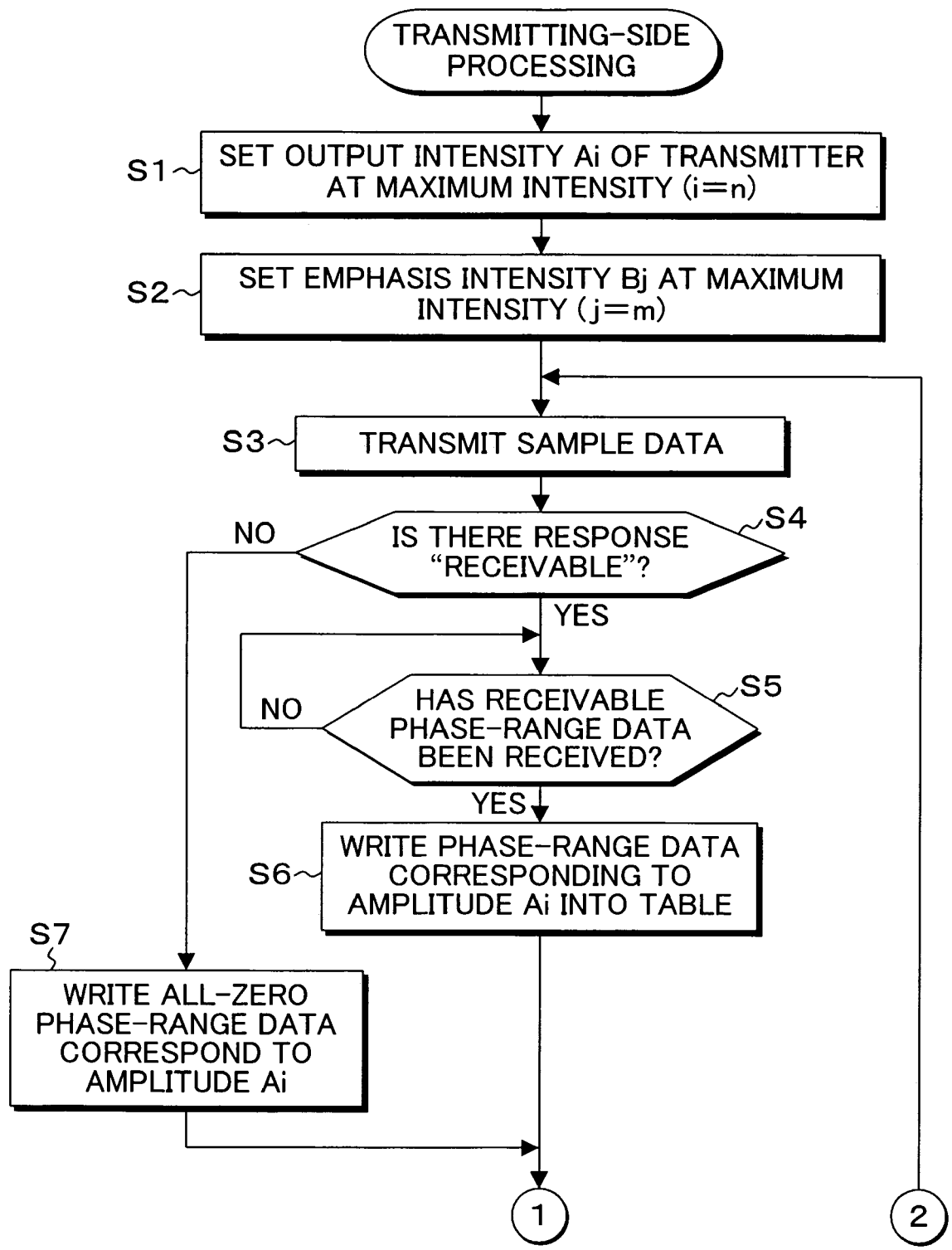
FIGS. 12A and 12B are flowcharts of the transmitting-side processing which determines an optimum value while changing the output amplitude and emphasis over the entire setting-changeable range.
Figure 12B:
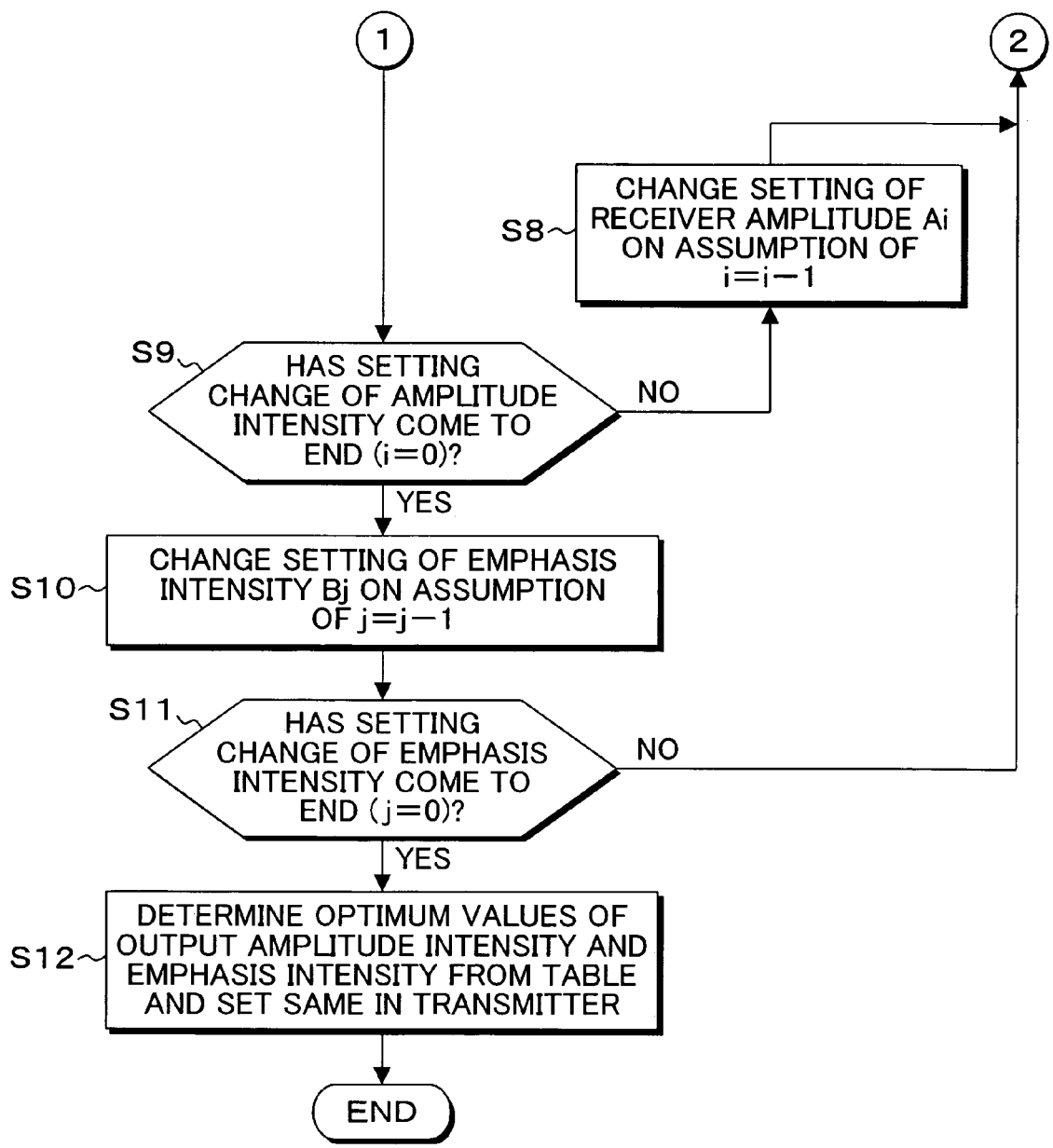

FIGS. 12A and 12B are flowcharts of the transmitting-side processing which determines optimum values of output amplitude and emphasis of the transmitter while changing the entire setting changeable range of output amplitude and emphasis. In FIGS. 13A and 13B, the processing of steps S1 to S9 is the same as the transmitting-side processing-side processing shown in FIG. 10. Upon the completion of setting change of output amplitude in step S9, i.e., when i=0 is determined, the setting of emphasis Bj is changed with j=j−1 in step S10, and if the setting change of emphasis is completed, i.e., if j=0 is not valid, in step S11, the process returns to step S3. Through the processing of steps S3 to S9, the processing of receiving receivable phase-range data and writing the same into the table is repeated while changing the setting of output amplitude to n stages for the emphasis after the change. When the setting change of emphasis, i.e., j=0 is determined in step S11, the process advances to step S12, and set values of output amplitude and emphasis are determined from the table and set in the transmitter.

Even in the processing of FIGS. 12A and 12B the setting may be changed by the two-dividing method known as binary search shown in FIG. 3, without conducting the change stage by stage for the entire range as to the setting change of output amplitude and emphasis of the receiver of steps S8 and S10. In an actual high-speed interface, when setting ranges of optimum output amplitude and emphasis for the transmitters 18 and 24 are empirically or statistically narrowed, the optimization adjustment of the transmitters in two-way transmission of the high-speed interface can be completed in a short period of time, for the entire ranges of setting change thus narrowed, by detecting a receivable range through generation of an eye diagram by transmission of sample data based on the present invention, writing the same into the table, and determining optimum values from the contents written in the table.

According to the present invention, there is further provided a program executed by the setting control units 30 and 40 of the devices 10 and 12. This program has processing procedures shown in the flowcharts of FIGS. 10A, 10B, 11 12A and 12B.

The above-mentioned embodiments have covered the cases of setting change by the two-dividing method as examples of setting change for narrowing optimum values of output amplitude and emphasis of the transmitter. The present invention is not limited to these embodiments, but can use any appropriate algorithm, if an algorithm is for changing set values for narrowing set values of a plurality of stages to particular optimum values.

The present invention includes appropriate variations not impairing the object and advantages of the invention, and is not limited by the numerical values shown in the above-mentioned embodiments.

What is claimed is:

1. An automatic transmitter adjusting method of a transmitting device which has a pair of devices each having a transmitter and a receiver, in which a transmitter of a first device is connected to a receiver of a second device, and a transmitter of said second device is connected to a receiver of said first device for two-way transmission; said method comprising:

a transmission processing step of transmitting sample data while changing the setting of an output amplitude and/or emphasis of the transmitter of said first device within a prescribed range;

a receiving processing step of generating an eye diagram from the sample data received by the receiver of said second device, and detecting and transmitting phase-range data from said eye diagram; and an optimization processing step of writing the phase-range data transmitted from said second device into a table in correspondence to said output amplitude and emphasis of which the setting has been changed, and determining optimum values of said output amplitude and emphasis from said table obtained at the end of setting change within said prescribed range for setting the optimum values in the transmitter of said first device;

wherein:

said transmission processing step initializes the maximum values of the output amplitude and emphasis, transmits sample data to the transmitter of said first device, and then, in a state in which said emphasis is fixed at the maximum value, transmits the sample data while changing the setting of said output amplitude within a prescribed range;

said receiving processing step receives the sample data transmitted while changing the setting of said output amplitude within the prescribed range in a state in which said emphasis is fixed at the maximum value, generates an eye diagram, and detects and transmits receivable phase-range data from said eye diagram; and said optimization processing step writes the phase-range data transmitted from said second device into the table in correspondence to said output amplitude of which the setting has been changed and determines an optimum value of said output amplitude from said table obtained at the end of the setting change within said prescribed range.

2. The automatic transmitter adjusting method according to claim 1, wherein, after determination of said optimum value of the output amplitude, said transmission processing step transmits the sample data while changing the setting of said emphasis within a prescribed range in a state in which said output amplitude is fixed at said optimum value for the transmitter of said first device;

said receiving processing step receives the sample data transmitted while changing the setting of said emphasis within a prescribed range in a state in which said output amplitude is fixed at an optimum value, generates an eye diagram, and detects and transmits receivable phase-range data from said eye diagram; and said optimization processing step writes the phase-range data transmitted from said second device into the table in correspondence to said emphasis of which the setting has been changed, determines an optimum value of said emphasis from said table obtained at the end of the setting change within said prescribed range, and sets the same for the transmitter of said first device.

3. The automatic transmitter adjusting method of a transmitting device which has a pair of devices each having a transmitter and a receiver, in which a transmitter of a first device is connected to a receiver of a second device, and a transmitter of said second device is connected to a receiver of said first device for two-way transmission; said method comprising:

a transmission processing step of transmitting sample data while changing the setting of an output amplitude and/or emphasis of the transmitter of said first device within a prescribed range;

a receiving processing step of generating an eye diagram from the sample data received by the receiver of said second device, and detecting and transmitting phase-range data from said eye diagram;

an optimization processing step of writing the phase-range data transmitted from said second device into a table in correspondence to said output amplitude and/or emphasis of which the setting has been changed, and determining optimum values of said output amplitude and emphasis from said table obtained at the end of setting change within said prescribed range for setting the optimum values in the transmitter of said first device;

wherein:

said transmission processing step initializes the maximum values of the output amplitude and emphasis, transmits sample data to the transmitter of said first device, and then, in a state in which said emphasis is fixed at the maximum value, transmits the sample data while changing the setting of said output amplitude within a prescribed range;

said receiving processing step receives the sample data transmitted while changing the setting of said output amplitude within the prescribed range in a state in which said emphasis is fixed at the maximum value, generates an eye diagram, and detects and transmits receivable phase-range data from said eye diagram; and said optimization processing step writes the phase-range data transmitted from said second device into the table in correspondence to said output amplitude of which the setting has been changed and determines an optimum value of said output amplitude from said table obtained at the end of the setting change within said prescribed range;

a transmission processing step of transmitting the sample data while changing the setting of the output amplitude and emphasis of the transmitter of said second device within a prescribed range;

a receiving processing step of generating an eye diagram from the sample data received by the receiver of said first device, and detecting and transmitting receivable phase-range data from said eye diagram; and an optimization processing step of writing the phase-range data transmitted from said first device into a second table in correspondence to said output amplitude and emphasis of which the setting has been changed, and determining optimum values of said output amplitude and emphasis from said second table obtained at the end of setting change within said prescribed range for setting the optimum values in the transmitter of said second device;

wherein:

said transmission processing step initializes the maximum values of the output amplitude and emphasis, transmits sample data to the transmitter of said second device, and then, in a state in which said emphasis is fixed at the maximum value, transmits the sample data while changing the setting of said output amplitude within a prescribed range;

said receiving processing step receives the sample data transmitted while changing the setting of said output amplitude within the prescribed range in a state in which said emphasis is fixed at the maximum value, generates an eye diagram, and detects and transmits receivable phase-range data from said eye diagram; and said optimization processing step writes the phase-range data transmitted from said second device into the table in correspondence to said output amplitude of which the setting has been changed and determines an optimum value of said output amplitude from said second table obtained at the end of the setting change within said prescribed range.

4. The automatic transmitter adjusting method according to claim 1, wherein said receiving processing step extracts a clock from the received sample data, and detects a receivable phase range by displacing by an one-unit interval in the time axis direction starting from the clock starting phase for said eye diagram.

5. The automatic transmitter adjusting method according to claim 1, wherein said receiving processing step transmits said phase-range data by the use of the transmitter before automatic adjustment at a low transmitting rate lower than a prescribed transmitting rate of the mega-bit order per second.

6. The automatic transmitter adjusting method according to claim 1, wherein, at the end of automatic adjustment of the own transmitter, said first device transmits an adjustment end notice to said other device, and upon receipt of said adjustment end notice, said other device starts automatic adjustment of the own transmitter.

7. The automatic transmitter adjusting method according to claim 1, wherein automatic adjustment of the transmitter is started upon receipt of an adjustment start instruction from outside or upon detection of a change in the device environment.

8. The automatic transmitter adjusting method according to claim 1 or 3, wherein said transmission processing step changes the setting of output amplitude and emphasis of said transmitter by the two-dividing method and transmits the sample data.

9. An automatic transmitter adjusting system which has a pair of devices each having a transmitter and a receiver, wherein two-way transmission is accomplished by connecting the transmitter of a first device to the receiver of another device, and the transmitter of the another device to the receiver of the first device; each of said devices comprising:

a transmission processing unit which transmits sample data to the other device while changing a setting of an output amplitude and/or emphasis of transmitter within a prescribed range;

an optimization processing unit which writes the phase-range data transmitted from the other device into a table in correspondence to said output amplitude and emphasis of which the setting has been changed, determines an optimum values of said output amplitude and emphasis from said table obtained at the end of setting change within said prescribed range, and sets the optimum values for own transmitter; and a receiving processing unit which generates an eye diagram from the sample data from the other device, detects the receivable phase-range data from said eye diagram, and transmits the detected receivable phase-range data to the other device;

wherein:

the transmission processing unit of said first device transmits the sample data while changing the setting of the output amplitude and emphasis of the own transmitter within a prescribed range;

the receiving processing unit of said other device generates an eye diagram from the sample data received by the own receiver, detects receivable phase-range data from said eye diagram, and transmits the phase-range data; and the optimization processing unit of said first device writes the phase-range data transmitted from said other device into the table in correspondence to said output amplitude and emphasis of which the setting has been changed, determines optimum values of said output amplitude and emphasis from said table obtained at the end of setting change within said prescribed range, and sets the optimum values for the own transmitter.

10. The automatic transmitter adjusting system according to claim 9, wherein, after the end of automatic transmitter adjustment of said first device:

the transmission processing unit of said other device transmits the sample data while changing the setting of the output amplitude and emphasis of the own transmitter within a prescribed range;

the receiving processing unit of said first device generates an eye diagram from the sample data received by the own receiver, detects the receivable phase-range data from said eye diagram, and transmits the phase-range data; and the optimization processing unit of said other device writes the phase-range data transmitted from said other device transmitted from said other device into the table in correspondence to said output amplitude and emphasis of which the setting has been changed, determines optimum values of said output amplitude and emphasis from said table obtained at the end of setting change within said prescribed range, and sets the same for the own transmitter.

11. The automatic transmitter adjusting system according to claim 9, wherein:

the transmission processing unit of said first device transmits the sample data while changing the setting of said output amplitude within a prescribed range in a state in which said emphasis is fixed at a maximum value after initializing the maximum values of output amplitude and emphasis for the own transmitter and transmitting the sample data;

the receiving processing unit of said other device receives the transmitted sample data while changing the setting of said output amplitude within a prescribed range in a state in which said emphasis is fixed at a maximum value, generates an eye diagram, and detects and transmits the receivable phase-range data from said eye diagram; and the optimization processing unit of said first device writes the phase-range data transmitted from said other device into table in correspondence to said output amplitude of which the setting has been changed, and determines an optimum value of said output amplitude from said table obtained at the end of setting change within said prescribed range.

12. The automatic transmitter adjusting system according to claim 11, wherein, after determining the optimum value of said output amplitude:

the transmission processing unit of said first device transmits the sample data while changing the setting of said emphasis within a prescribed range in a state in which said output amplitude of the won transmitter is fixed at said optimum value;

the receiving processing unit of said first device generates an eye diagram by receiving sample data transmitted while changing the setting of said emphasis within a prescribed range in a state in which said output amplitude is fixed at an optimum value, detecting receivable phase-range data from said eye diagram and transmits the same;

the optimization processing unit of said first device writes the phase-range data transmitted from said other device in correspondence to said emphasis of which the setting has been changed, determines an optimum value of said emphasis from said table obtained at the end of setting change within said prescribed range, and sets the same for the own transmitter.

13. The automatic transmitter adjusting system according to claim 9, wherein said receiving processing unit extracts a clock from the received sample data, and detects a receivable phase range by displacing by one unit interval in the time axis direction from the clock starting phase in said eye diagram.

14. The automatic transmitter adjusting system according to claim 9, wherein said receiving processing unit transmits said phase-range data by the use of the transmitter before automatic adjustment at a low transmitting rate lower than a prescribed transmitting rate of the mega-bit order per second.

15. The automatic transmitter adjusting system according to claim 9, wherein, at the end of automatic adjustment of its own transmitter, said first device transmits an adjustment end notice to said other device, and upon receipt of said adjustment end notice, said other device starts automatic adjustment of the own transmitter.

16. A computer-readable storage medium which store an automatic transmitter adjusting program causing a computer of each of a pair of devices each having a transmitter and a receiver, wherein two-way transmission is accomplished by connecting the transmitter of a first device to the receiver of the other device via a transmission line, and the transmitter of the other device to the receiver of the first device via another transmission line, to execute:

a transmission processing step of transmitting sample data while changing a setting of an output amplitude and emphasis of the own transmitter within a prescribed range;

an optimization processing step of writing a phase-range data transmitted from said other device in correspondence to said output amplitude and emphasis of which the setting has been changed, determining an optimum values of said output amplitude and emphasis from said table obtained at the end of setting change within said prescribed range, and setting the optimum values for the own transmitter; and a receiving processing step of generating an eye diagram from sample data received by the receiver of said other device, detecting the receivable phase-range data from said eye diagram, and transmitting the receivable phase-range data;

wherein:

said transmission processing step transmits sample data while changing the setting of said output amplitude within a prescribed range in a state in which said emphasis is fixed at a maximum value, after initializing the maximum values of the output amplitude and emphasis in the own transmitter and transmitting the sample data; and said optimization processing step writes phase-range data transmitted from the transmission destination device in correspondence to said output amplitude of which the setting has been changed, and determines an optimum value of said output amplitude from said table obtained at the end of setting change within said prescribed range.

17. The storage medium according to claim 16, wherein, after determining an optimum value of said output amplitude:

said transmission processing step transmits sample data while changing the setting of said emphasis within a prescribed range in a state in which said output amplitude of the own transmitter is fixed at said optimum value;

said optimization processing step writes the phase-range data transmitted from the transmission destination device in correspondence to said emphasis of which the setting has been changed, determines an optimum value of said emphasis from said table obtained at the end of setting change within said prescribed range, and sets the optimum value in the own transmitter.

* * * * *

UNITED STATES PATENT AND TRADEMARK OFFICE
CERTIFICATE OF CORRECTION

PATENT NO. : 7,733,967 B2  Page 1 of 1
APPLICATION NO. : 11/289423
DATED : June 8, 2010
INVENTOR(S) : Manabu Yamazaki It is certified that error appears in the above-identified patent and that said Letters Patent is hereby corrected as shown below:

Column 20, Line 24, change "won" to --own--.

Signed and Sealed this

Seventh Day of December, 2010

David J. Kappos
*Director of the United States Patent and Trademark Office*